(12) United States Patent
Snider et al.

(10) Patent No.: US 10,559,153 B2
(45) Date of Patent: Feb. 11, 2020

(54) VEHICLE WINDOW ASSEMBLY WITH INTEGRATED TOUCH/PROXIMITY SENSOR

(71) Applicant: MAGNA MIRRORS OF AMERICA, INC., Holland, MI (US)

(72) Inventors: Darin J. Snider, Holland, MI (US); David K. Johnson, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/019,637

(22) Filed: Jun. 27, 2018

(65) Prior Publication Data

US 2019/0005755 A1 Jan. 3, 2019

Related U.S. Application Data

(60) Provisional application No. 62/527,134, filed on Jun. 30, 2017.

(51) Int. Cl.
| | |
|---|---|
| *B60R 5/00* | (2006.01) |
| *G07C 9/00* | (2020.01) |
| *G06F 3/044* | (2006.01) |
| *B60R 25/34* | (2013.01) |

(52) U.S. Cl.
CPC .......... *G07C 9/00857* (2013.01); *B60R 25/34* (2013.01); *G06F 3/044* (2013.01); *G07C 9/00896* (2013.01)

(58) Field of Classification Search
None
See application file for complete search history.

(56) References Cited

U.S. PATENT DOCUMENTS

| | | | |
|---|---|---|---|
| 5,551,197 A | 9/1996 | Repp et al. | |
| 5,594,222 A | 1/1997 | Caldwell | |
| 5,853,895 A | 12/1998 | Lewno | |
| 6,001,486 A | 12/1999 | Varaprasad et al. | |
| 6,116,678 A * | 9/2000 | Beck ........................ | B60J 1/10 296/146.15 |
| 6,310,611 B1 | 10/2001 | Caldwell | |
| 6,320,282 B1 | 11/2001 | Caldwell | |

(Continued)

*Primary Examiner* — Julie B Lieu
(74) *Attorney, Agent, or Firm* — Honigman LLP

(57) ABSTRACT

A window assembly for a vehicle includes a glass window panel having a non-light-transmitting layer established at a perimeter region thereof, and a sensing device disposed at the glass window panel at and behind the non-light-transmitting layer. The non-light-transmitting layer has at least one light-transmitting aperture or icon or alphanumeric character established thereat. The sensing device is disposed at the glass window panel such that a sensor and an illumination source of the sensing device are disposed at each of the light-transmitting apertures established at the non-light-transmitting layer. When the illumination sources are activated, the respective illumination source emits light through the respective light-transmitting aperture and does not emit light through the non-light-transmitting layer, whereby a person viewing the window panel from exterior of the vehicle views a plurality of icons or alphanumeric characters illuminated by respective ones of the illumination sources when the illumination source is/are activated.

22 Claims, 22 Drawing Sheets

(56) References Cited

U.S. PATENT DOCUMENTS

| | | | |
|---|---|---|---|
| 6,369,804 B1 | 4/2002 | Sandbach | |
| 6,437,258 B1 | 8/2002 | Sandbach | |
| 6,452,479 B1 | 9/2002 | Sandbach | |
| 6,492,980 B2 | 12/2002 | Sandbach | |
| 6,501,465 B2 | 12/2002 | Sandbach | |
| 6,504,531 B1 | 1/2003 | Sandbach | |
| 6,617,975 B1 | 9/2003 | Burgess | |
| 6,627,918 B2 | 9/2003 | Getz et al. | |
| 6,691,494 B2 | 2/2004 | Nomoto et al. | |
| 7,003,916 B2 | 2/2006 | Nestell et al. | |
| 7,073,293 B2 | 7/2006 | Galer | |
| 7,162,840 B1 * | 1/2007 | Thomas | B60J 1/10 296/146.15 |
| 7,224,324 B2 | 5/2007 | Quist et al. | |
| 7,249,860 B2 | 7/2007 | Kulas et al. | |
| 7,253,723 B2 | 8/2007 | Lindahl et al. | |
| 7,255,541 B2 | 8/2007 | Kuramoto et al. | |
| 7,446,924 B2 | 11/2008 | Schofield et al. | |
| 7,733,332 B2 | 6/2010 | Steenwyk et al. | |
| 8,402,695 B2 | 3/2013 | Smith et al. | |
| 8,881,458 B2 | 11/2014 | Snider et al. | |
| 9,346,403 B2 | 5/2016 | Uken et al. | |
| 9,598,016 B2 | 3/2017 | Blank et al. | |
| 10,124,767 B1 * | 11/2018 | Salter | B60R 25/23 |
| 2003/0213179 A1 | 11/2003 | Galer | |
| 2004/0020131 A1 | 2/2004 | Galer et al. | |
| 2006/0107600 A1 | 5/2006 | Nestell et al. | |
| 2007/0018790 A1 | 1/2007 | LaFrance | |
| 2008/0127563 A1 | 6/2008 | Tooker | |
| 2011/0057773 A1 | 3/2011 | Newman et al. | |
| 2014/0170357 A1 | 6/2014 | Tooker et al. | |
| 2014/0240997 A1 * | 8/2014 | Massault | B32B 17/10036 362/487 |
| 2017/0005077 A1 * | 1/2017 | Kim | G02B 6/0041 |
| 2017/0066305 A1 | 3/2017 | Tooker et al. | |
| 2017/0139506 A1 * | 5/2017 | Rodriguez | B29C 45/14688 |

* cited by examiner

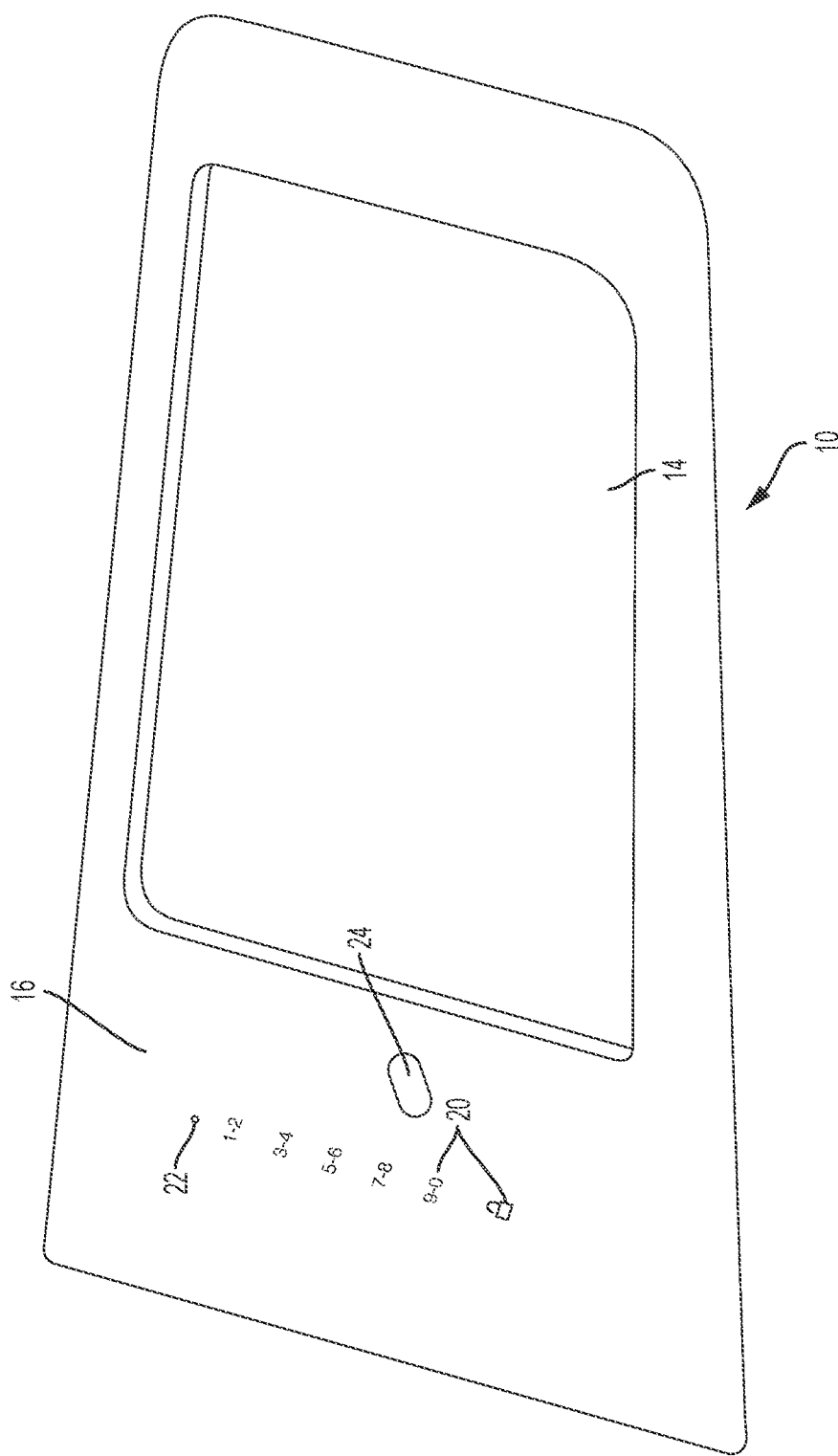

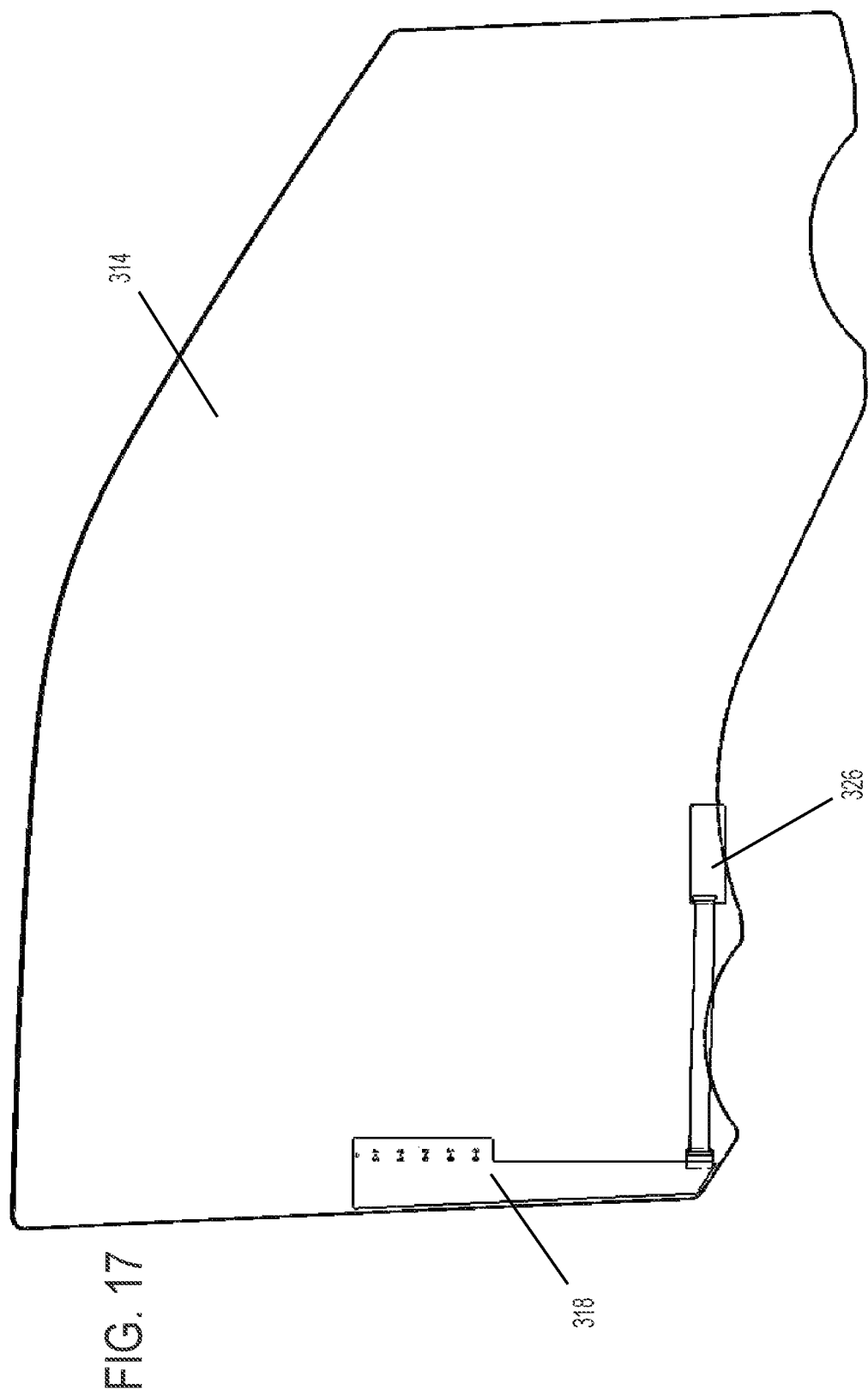

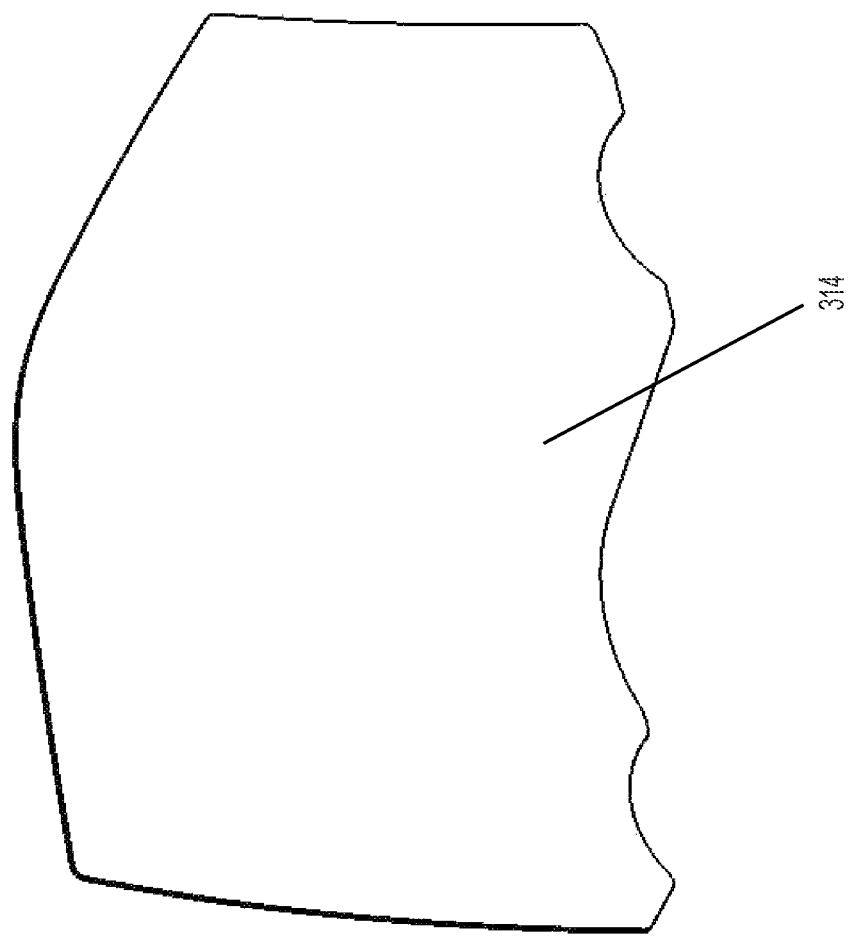
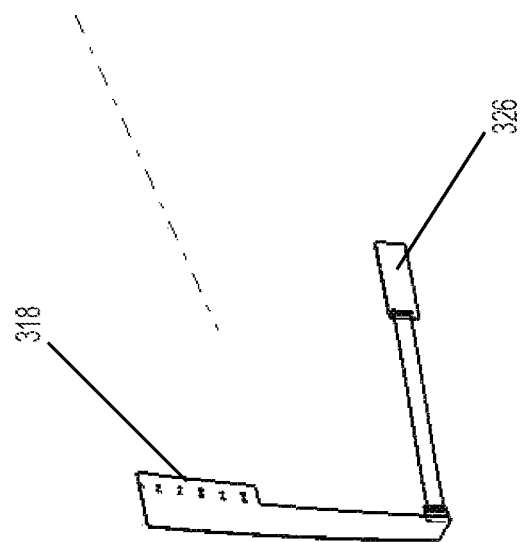
FIG. 18

VEHICLE WINDOW ASSEMBLY WITH INTEGRATED TOUCH/PROXIMITY SENSOR

CROSS REFERENCE TO RELATED APPLICATION

The present application claims the filing benefits of U.S. provisional application Ser. No. 62/527,134, filed Jun. 30, 2017, which is hereby incorporated herein by reference in its entirety.

FIELD OF THE INVENTION

The present invention relates to window assemblies for vehicles and, more particularly to a side or rear fixed window assembly for a vehicle.

BACKGROUND OF THE INVENTION

It is known to provide a keypad (for locking/unlocking a door) at the B-pillar of the door or vehicle.

SUMMARY OF THE INVENTION

The present invention provides a vehicle window assembly that comprises a sensing device disposed behind a glass window panel and at an area or region of the glass window panel where a non-light-transmitting layer or ceramic frit layer is established. A plurality of windows or apertures, such as alphanumeric characters and/or icons, are established through the non-light-transmitting layer such that light emitted by an illumination source of the sensing device passes through the formed alphanumeric windows or apertures or characters and/or icons and does not pass through the non-light-transmitting layer. The sensing device includes a plurality of individual sensors that sense touch or proximity of a person's finger at a respective one or more of the windows or apertures or alphanumeric characters and/or icons. The window assembly of the present invention thus provides a touch or proximity sensor, which may provide a locking/unlocking function for one or more doors of the vehicle and/or other suitable functions, depending on the particular functions programmed for a coded or programmed touch sequence or combination of the alphanumeric characters and/or icons and sensors. The sensing device is integrated in the window assembly so as to be part of the window assembly when shipped to a vehicle assembly plant, whereby electrical connection to the sensing device is made via a wire harness of the vehicle when the window assembly is installed at the vehicle body.

These and other objects, advantages, purposes and features of the present invention will become apparent upon review of the following specification in conjunction with the drawings.

BRIEF DESCRIPTION OF THE DRAWINGS

FIG. 5 is a side elevation view of another window assembly of the present invention, shown with a window through the frit layer for a gesture sensing device;

FIG. 17 is a side elevation of another window assembly and touch sensor, with the touch sensor disposed at a movable window panel; and FIG. 18 is an exploded view of the window assembly and touch sensor of FIG. 17.

DESCRIPTION OF THE PREFERRED EMBODIMENTS

Figure 1:
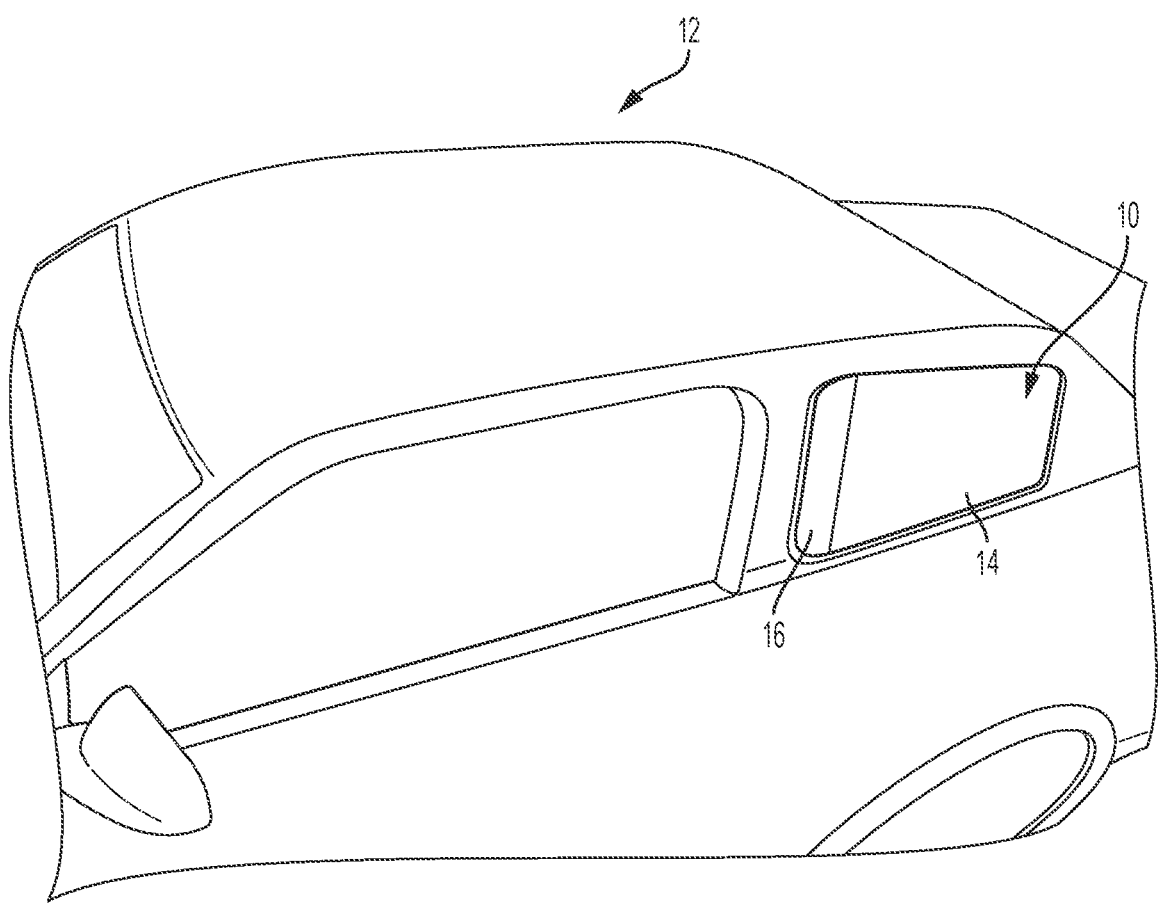
FIG. 1 is a perspective view of a vehicle having a window assembly in accordance with the present invention.
Figure 2:
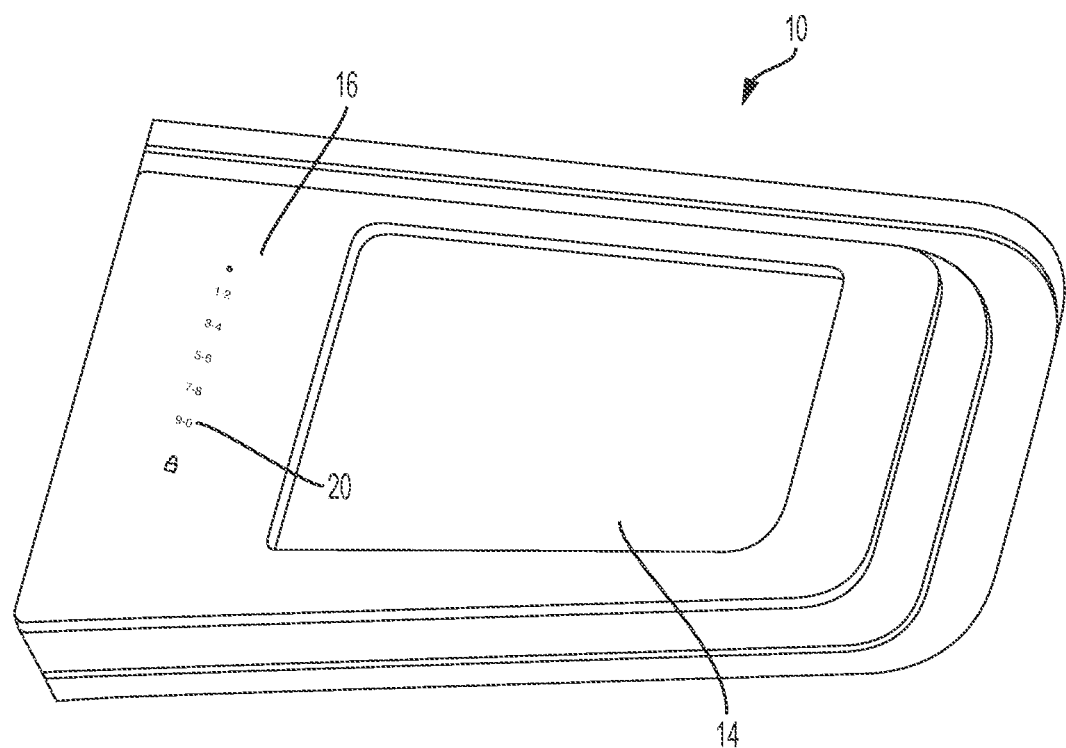
FIG. 2 is a side elevation of a window assembly of the present invention.

Referring now to the drawings and the illustrative embodiments depicted therein, a window assembly 10 of a vehicle 12 comprises a glass window panel 14 with a non-light transmissive layer or darkening layer or ceramic frit layer 16 established at a perimeter region of the glass panel 14 (FIG. 1). The window assembly 10 include a touch sensor device 18 that is disposed behind the window panel 14 at the frit layer 16, with numbers and/or icons 20 established through the frit layer, as discussed below. The touch sensor device 18 includes backlighting such that the numbers and/or icons 20 are illuminated when the light source of the touch sensor device 18 is activated (such as responsive to a touch at the sensor region or detection of a passive entry device carried by a person approaching the vehicle or the like).

Figure 4:
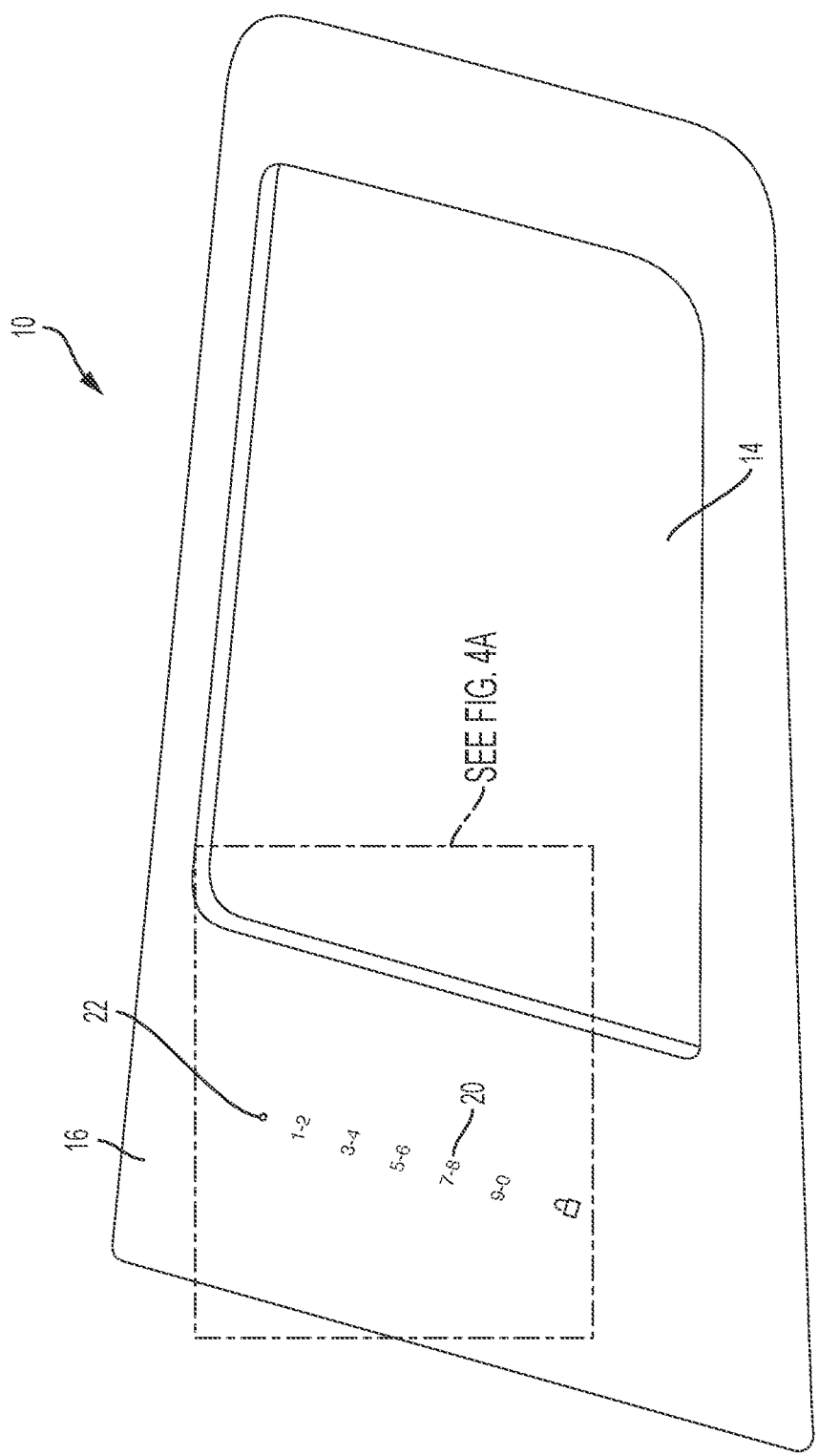
FIG. 4 is a side elevation of another window assembly of the present invention.
Figure 4A:
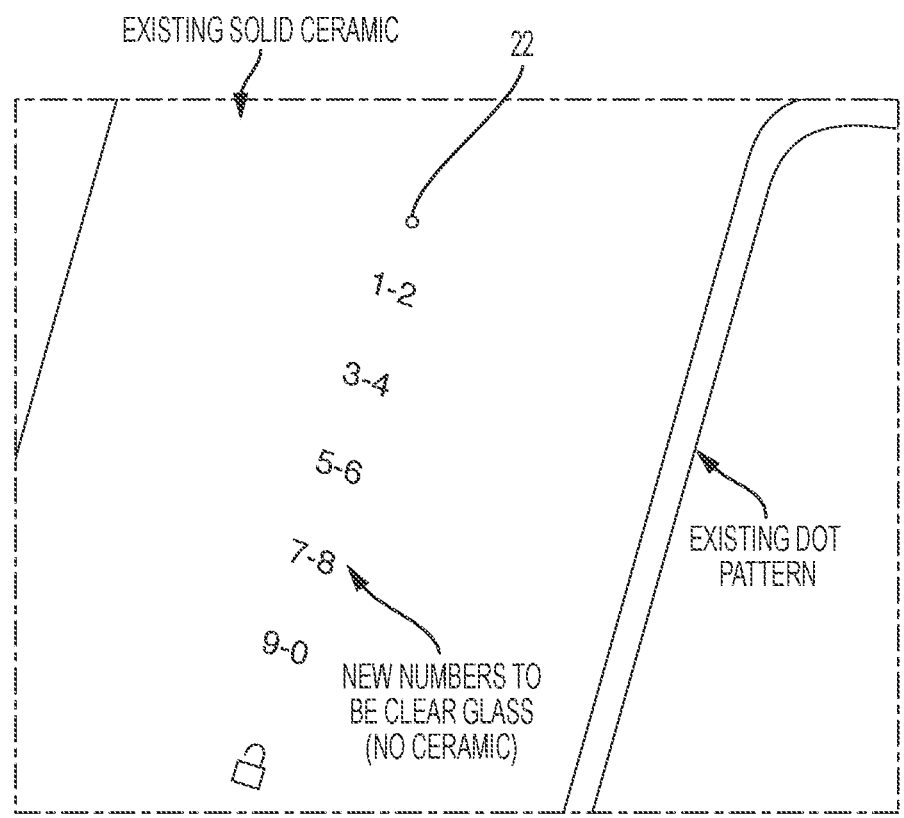
FIG. 4A is an enlarged view of the area A in FIG. 4.

The window panel 14 may have the ceramic frit layer (or other suitable darkening or hiding layer) established via any suitable means, such that the window panel has a dark or black perimeter region. In the illustrated embodiment, the forward perimeter region of the window panel has a wider frit layer, and the touch sensor device is disposed at the window panel (such as attached at an interior surface of the window panel) at that forward perimeter region. As can be seen with reference to FIGS. 2 and 4-8, when the light source(s) of the touch sensor device 18 is/are activated, the numbers and/or icons 20 are illuminated (and may be illuminated in any desired color, such as, for example, red or white, depending on the particular application of the window assembly). Optionally, the sensing device includes a feedback light source that illuminates responsive to determination of a successful actuation of one of the inputs or sensors at the numbers and/or icons 20, and is visible at the exterior of the window panel via an aperture 22 (FIGS. 4 and 4A) formed or established through the non-light-transmitting layer.

The numbers and/or icons 20 (and aperture 22) are established at the frit layer such that light passes through the window panel at the numbers and/or icons, but does not pass through the window panel at the frit coated region surrounding the numbers and/or icons. For example, the numbers and/or icons 20 (and aperture 22) may be masked during the coating or establishing of the frit layer so that no frit layer is established at the masked numbers and/or icons. Optionally, the numbers and/or icons and/or aperture may be etched through an already established frit layer, or may otherwise be formed at the frit layer region such that light passes through the formed numbers and/or icons and/or aperture. The icons/numbers/aperture are thus established at clear glass, without any frit or darkening layer thereat (but with the frit/darkening layer surrounding the icon/number/aperture shapes).

Figure 3:
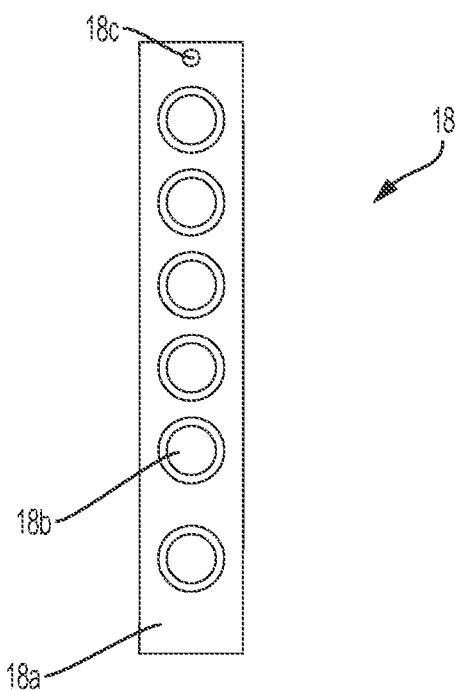
FIG. 3 is a plan view of a touch sensor device of the window assembly of FIG. 2.

As shown in FIG. 3, the touch sensor device 18 comprises a printed circuit board or rigid or flexible circuit element 18a with a plurality of individual touch or proximity sensors 18b disposed thereat, with each touch or proximity sensor 18b corresponding with a respective number or icon of the numbers and/or icons 20 established through the frit layer. For example, the numbers and/or icons may include "1-2", "3-4", "5-6", "7-8" and "9-0", along with an icon of a lock. Each of the number pairs and icon are established through the frit layer or established by the frit layer outlining the numbers/icons so that illumination emitted by said touch sensor device passes through the numbers/icons but does not pass through the frit layer, such that only the numbers/icons are viewable at the darkened region of the window panel when the illumination source of the touch sensor device is activated. Also, a feedback illumination source 18c may be disposed at the circuit element 18a and may be disposed behind the aperture 22 established through the frit layer. When the sensing device determines a successful touch at one or more of the individual sensors, the illumination source 18c may be activated so the person at the window is informed of the successful touch. The touch sensor device may have a dark color, such that the touch sensor device is not viewable through the formed numbers/icons/apertures when the illumination sources are deactivated.

Figure 6:
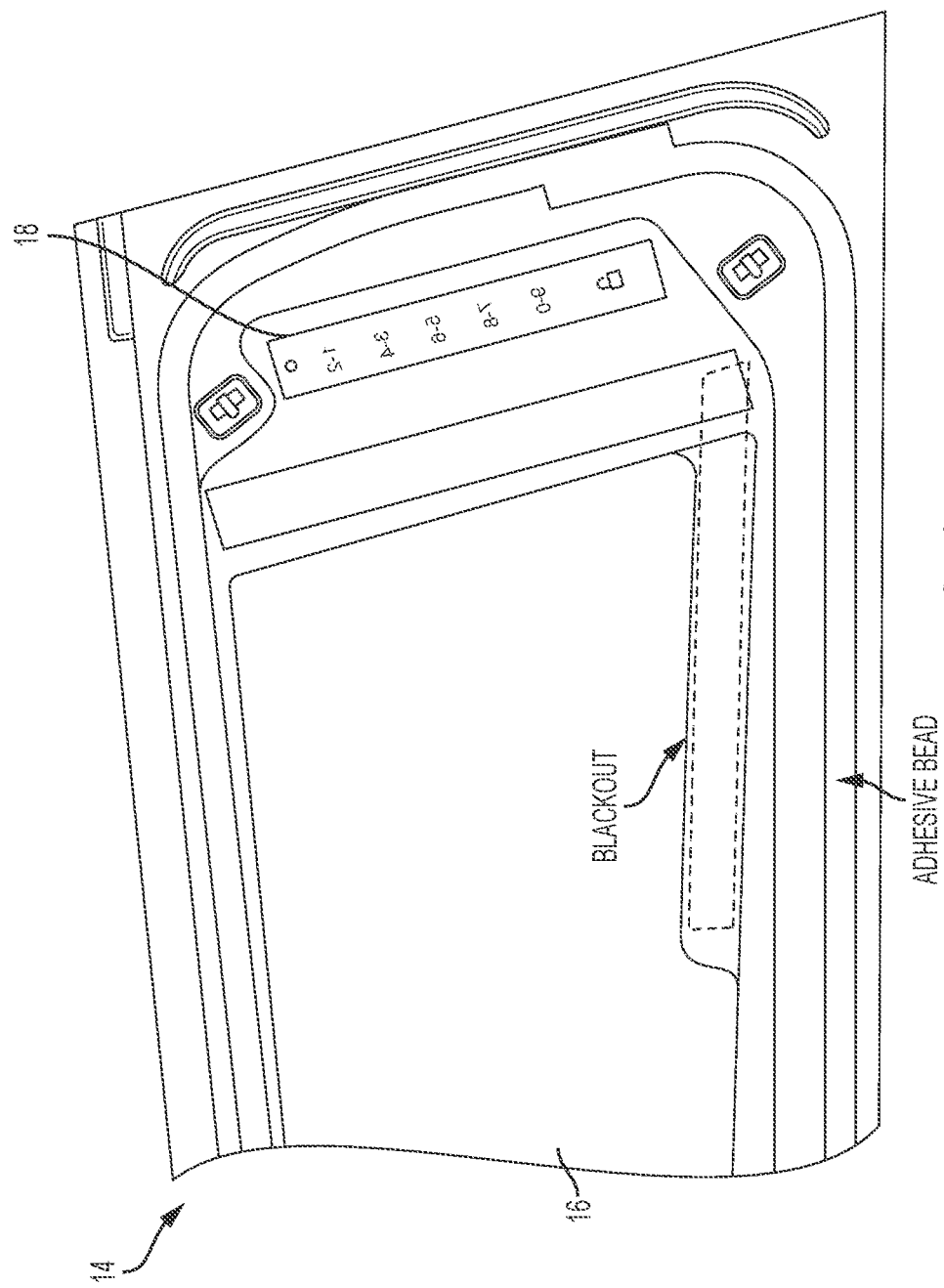
FIG. 6 is a plan view of an interior side of the window assembly, showing optional locations for the sensing device of the present invention.
Figure 7:
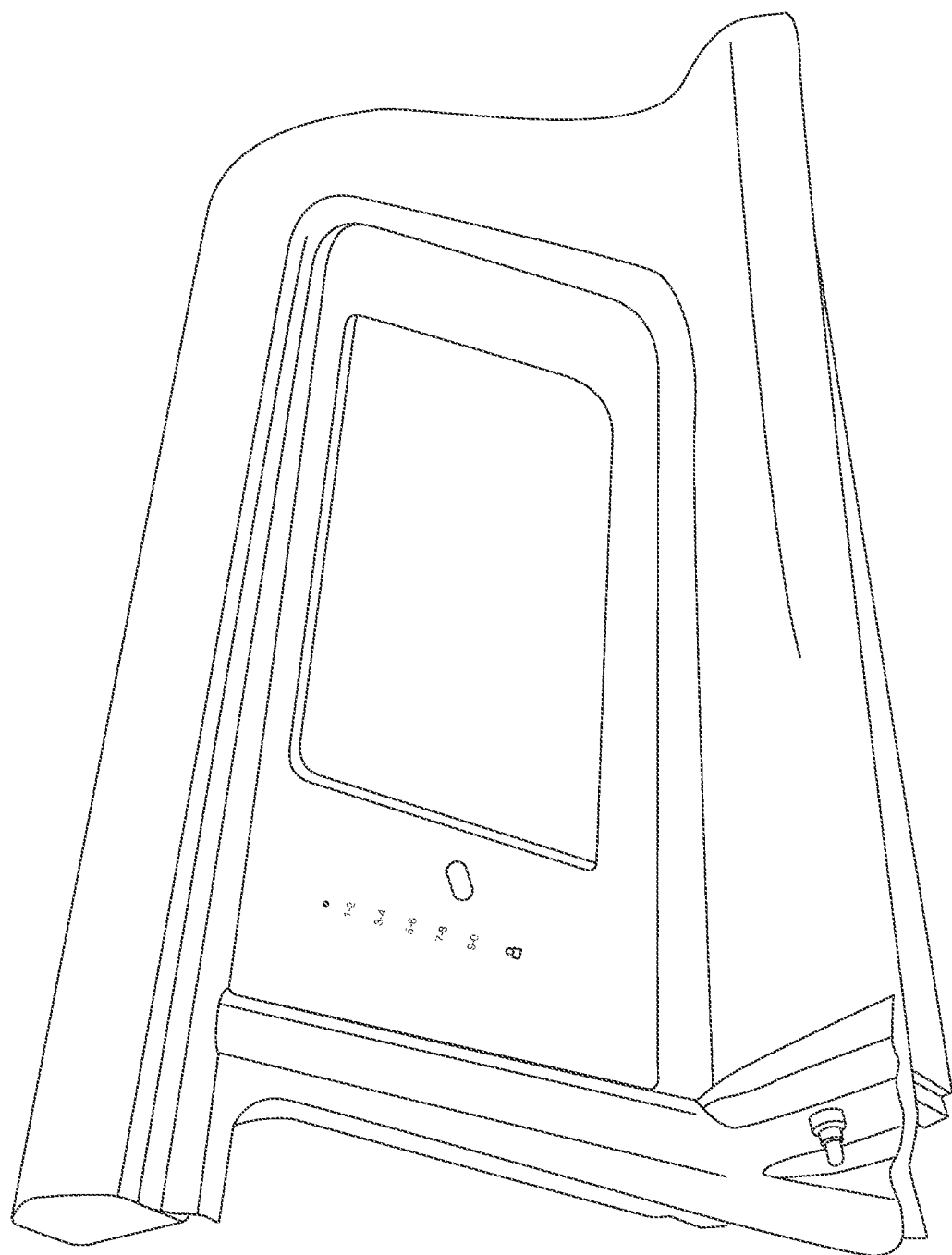
FIG. 7 is a perspective view of a sample window assembly in accordance with the present invention.
Figure 8:
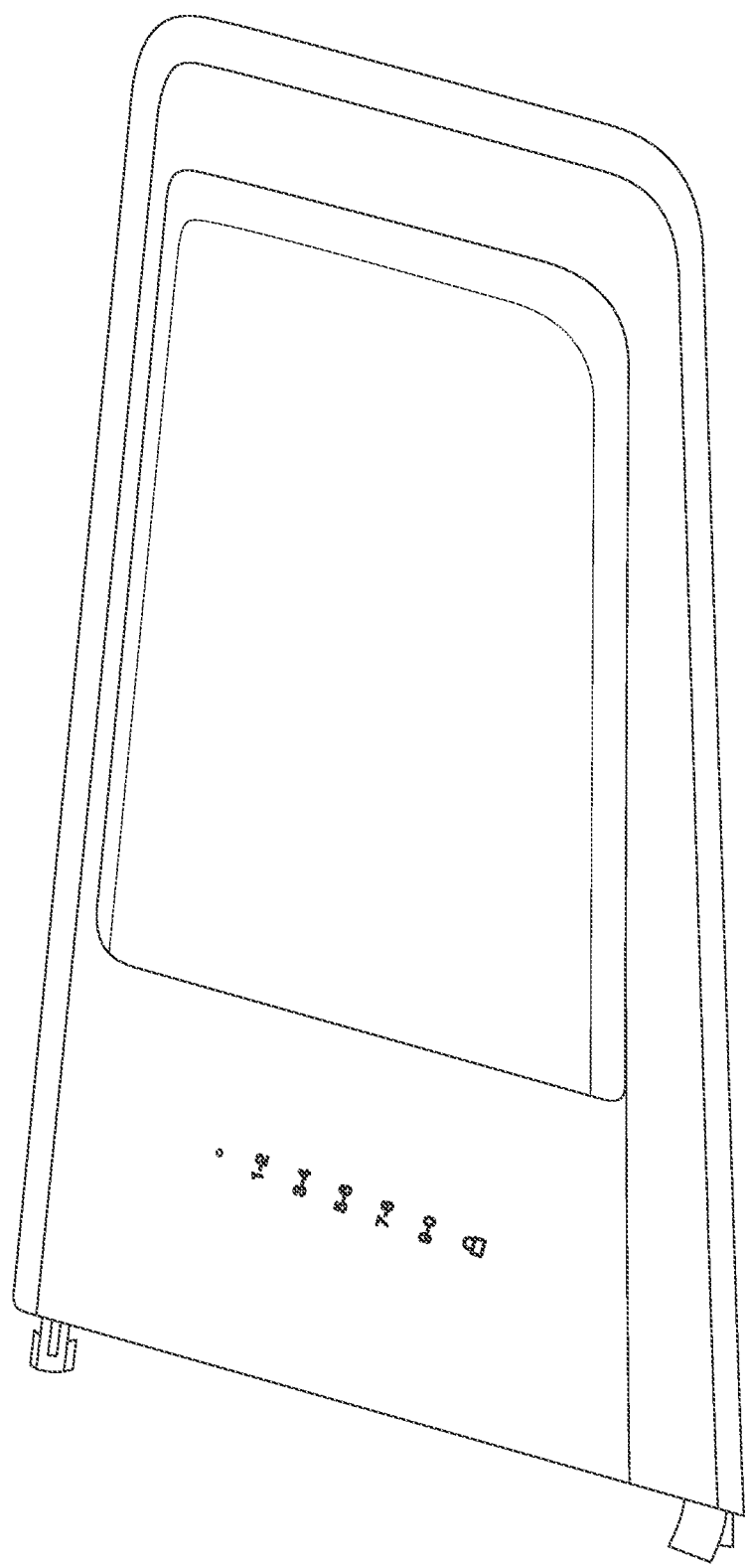
FIG. 8 is a perspective view of another sample window assembly in accordance with the present invention.
Figure 8A:
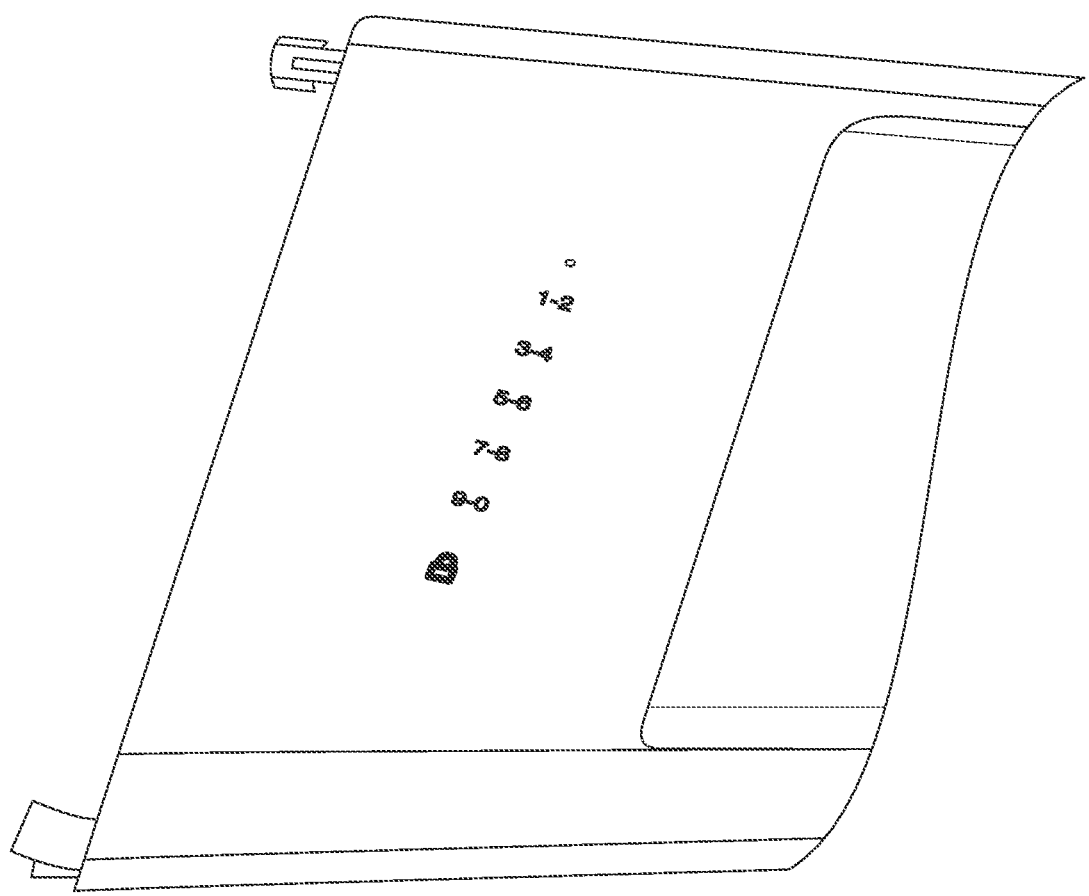
FIG. 8A is an enlarged perspective view of the touch sensor region of the window assembly of FIG. 8.
Figure 9:
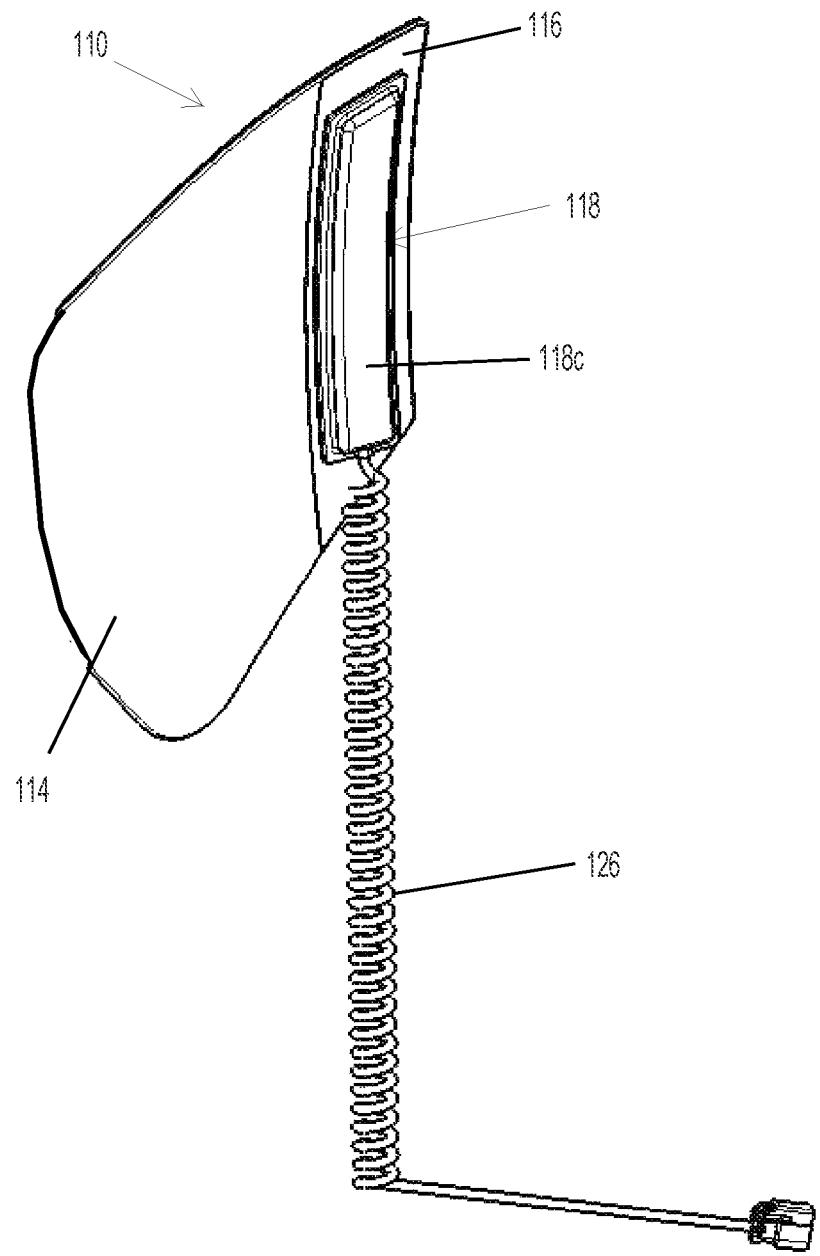
FIG. 9 is a perspective view of a window assembly and touch sensor in accordance with the present invention.
Figure 10:
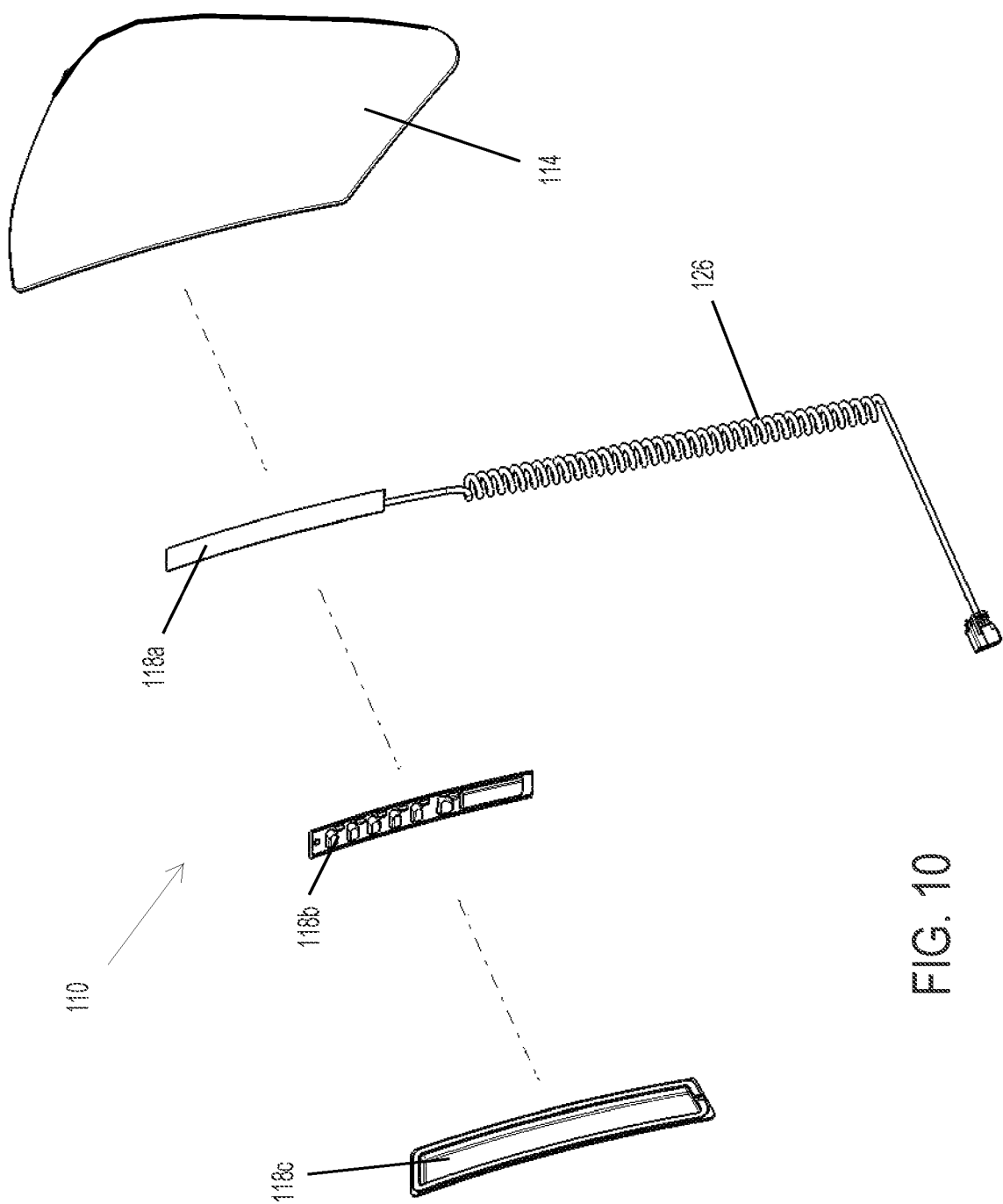
FIG. 10 is an exploded perspective view of the window assembly and touch sensor of FIG. 9.
Figure 11:
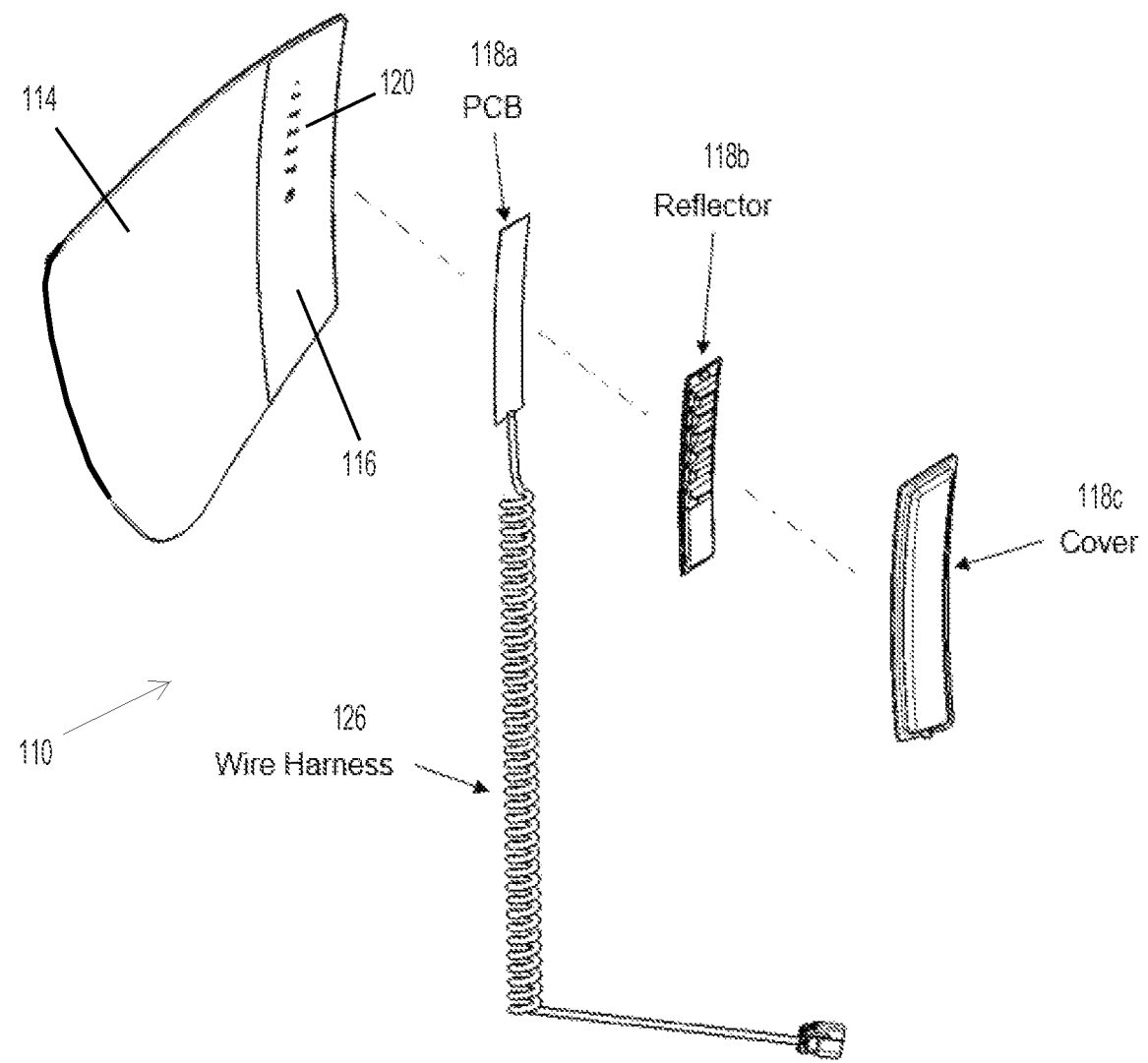
FIG. 11 is another exploded perspective view of the window assembly and touch sensor of FIG. 9.

As shown in FIG. 6, the sensing device is disposed behind the window panel at an interior surface of the window panel. The blackout or frit layer may be established to accommodate the sensing device being in an angled or generally vertical or generally horizontal orientation. The sensing device may be adhered to the window panel or may be attached or retained thereat via any other suitable means. For example, the sensing device may be overmolded by a perimeter window encapsulant or the like, which is overmolded along the periphery of the window panel. The sensing device may be electrically connected to a wire harness of the vehicle or may electrically connect to one or more electrically conductive traces established at the interior surface of the vehicle window, such as by utilizing aspects of the window assemblies described in U.S. Publication No. US-2017-0246984, which is hereby incorporated herein by reference in its entirety.

Optionally, the sensing device may include "gesture" technology so that the device can detect an authorized user's (such as a person carrying a key fob for the vehicle) hand wave or other gesture, and can unlock/lock the door accordingly (and/or generate other outputs to perform other functions responsive to recognition of the user's gesture). The sensing device thus may include one or more other sensors (such as imaging sensors or the like) that are disposed behind and view or sense through another aperture or window of the non-light-transmitting layer, so as to sense the presence and movement of a person's hand or the like at or near the door or window, such as by utilizing aspects of the window assemblies described in U.S. Publication No. US-2018-0094471, which is hereby incorporated herein by reference in its entirety. For example, and such as shown in FIG. 5, the window assembly 10 may include a gesture sensing device disposed at and viewing through an aperture 24 established through the non-light-transmitting layer 16. The gesture sensing sensors are not backlit or illuminated so that they are not viewable through the respective aperture or apertures formed or established through the non-light-transmitting layer of the window panel.

Optionally, the sensing device or module may include an electrical connector extending therefrom for electrically connecting the sensing device to a vehicle wire harness when the window assembly is installed at the vehicle (and before or after the sensing device is attached or bonded at the interior surface of the window panel). For example, and as shown in FIGS. 9-12, a window assembly 110 includes a touch sensor device 118 that is disposed behind the window panel 114 at the frit layer 116, with numbers and/or icons 120 (FIG. 11) established through the frit layer. The touch sensor device 118 includes backlighting such that the numbers and/or icons 120 are illuminated when the light source of the touch sensor device 118 is activated (such as responsive to a touch at the sensor region or detection of a passive entry device carried by a person approaching the vehicle or the like). The touch sensor device 118 includes an electrical lead or wire or connector 126 for electrically connecting the device 118 to a vehicle wire harness.

In the illustrated embodiment, the touch sensor device 118 includes a circuit element 118a, a reflector 118b and a cover 118c that encases the reflector and circuit element at the interior surface of the glass window panel 114. The circuit element 118a may comprise a printed circuit board or flexible circuit board or substrate having circuitry and light emitting diodes disposed thereat. The light emitting diodes (LEDs) may be spaced along the circuit board so as to be generally behind respective numbers or icons 120 etched through the frit layer of the window panel. The reflector 118b is formed to have individual light reflecting elements or portions or cavities at each of the LEDs so that, when the LEDs are powered, light emitted by the LEDs is reflected toward the window panel so as to be viewable at the etched icons or numbers 120 at the frit layer of the window panel. The circuit element may comprise a transparent substrate or may have apertures formed therethrough to allow light emitted by the LEDs and reflected by the reflector to pass through the window for viewing at the etched numbers. The cover 118c encases or houses the reflector and circuit element at the window panel.

Figure 12:
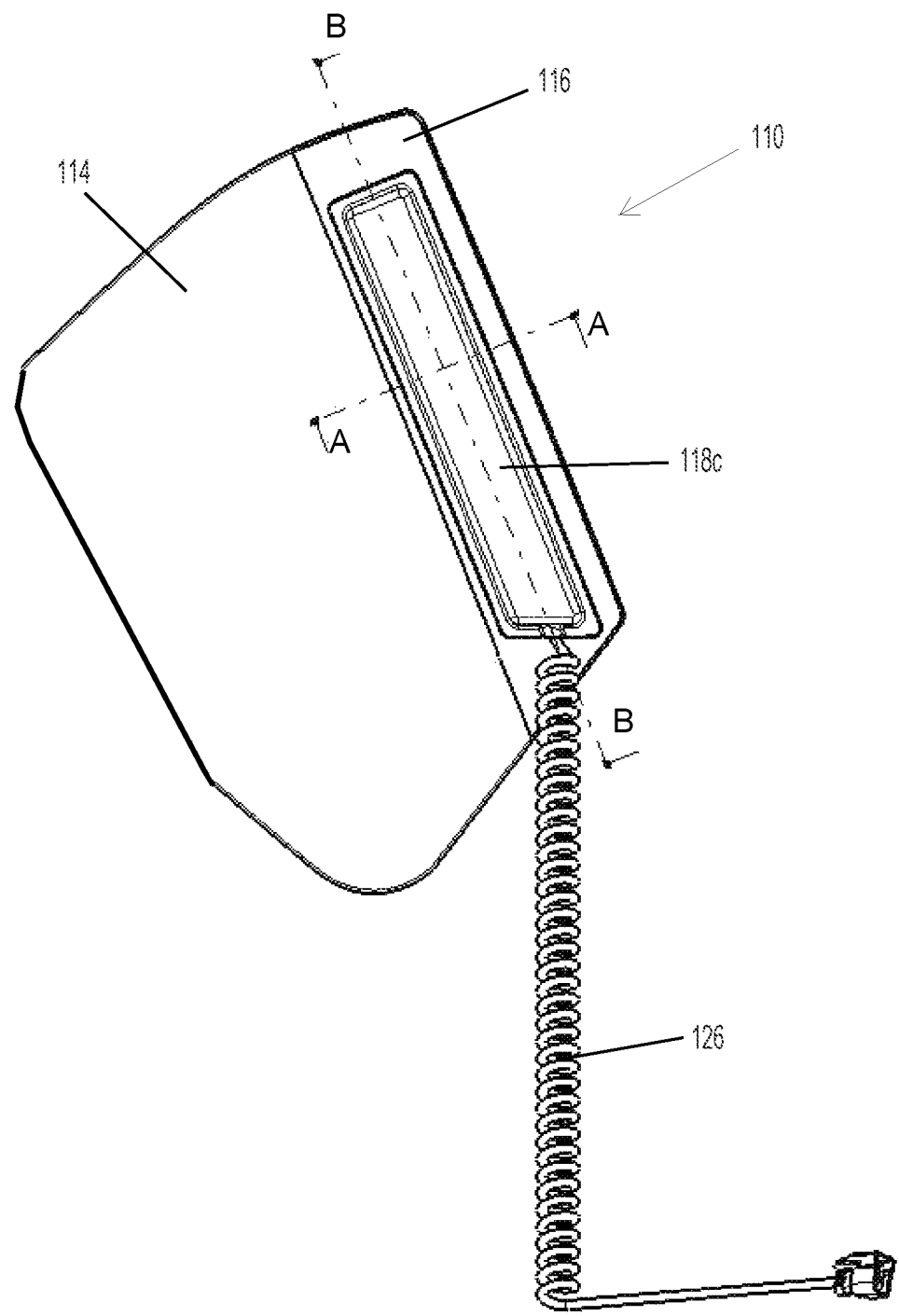
FIG. 12 is a side elevation of the window assembly and touch sensor of FIG. 9.
Figure 12A:
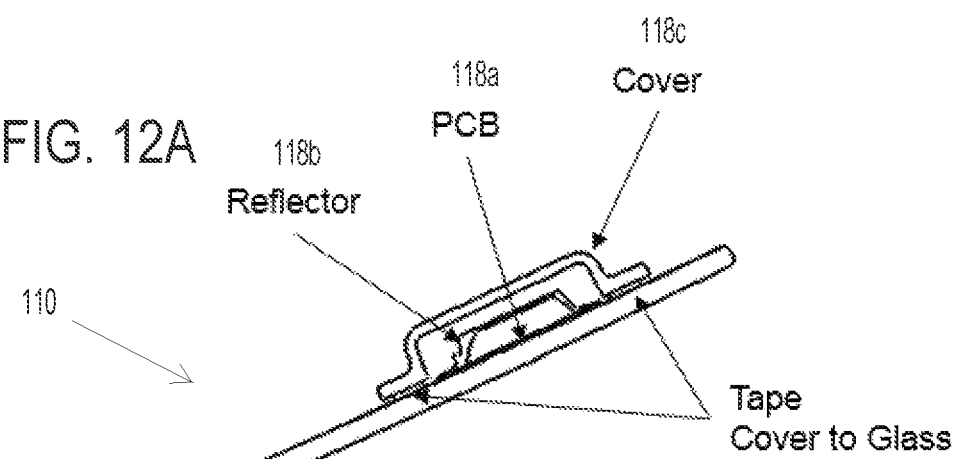
FIG. 12A is a sectional view taken along the line A-A in FIG. 12.
Figure 12B:
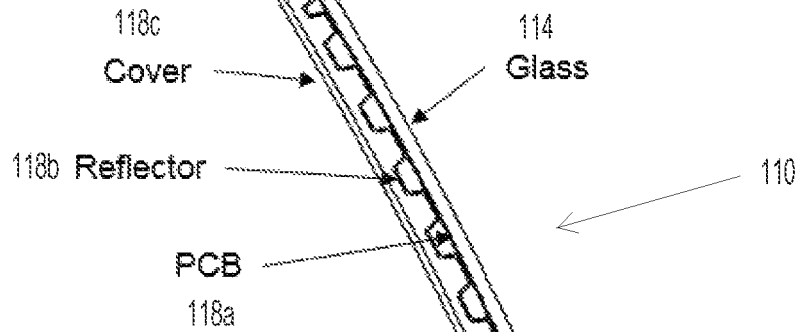
FIG. 12B is a sectional view taken along the line B-B in FIG. 12.
Figure 13:
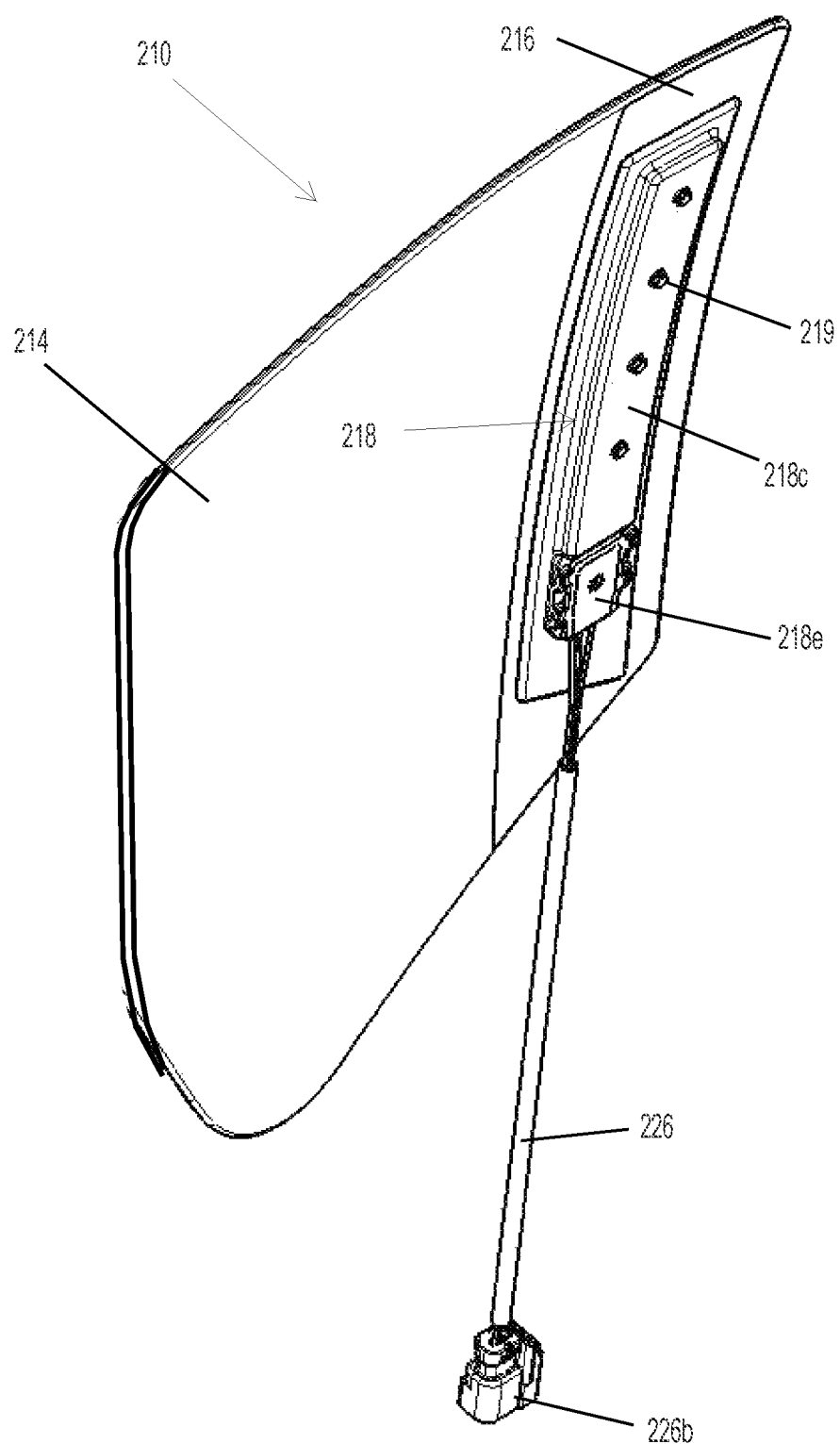
FIG. 13 is a perspective view of a window assembly and touch sensor in accordance with the present invention.
Figure 14:
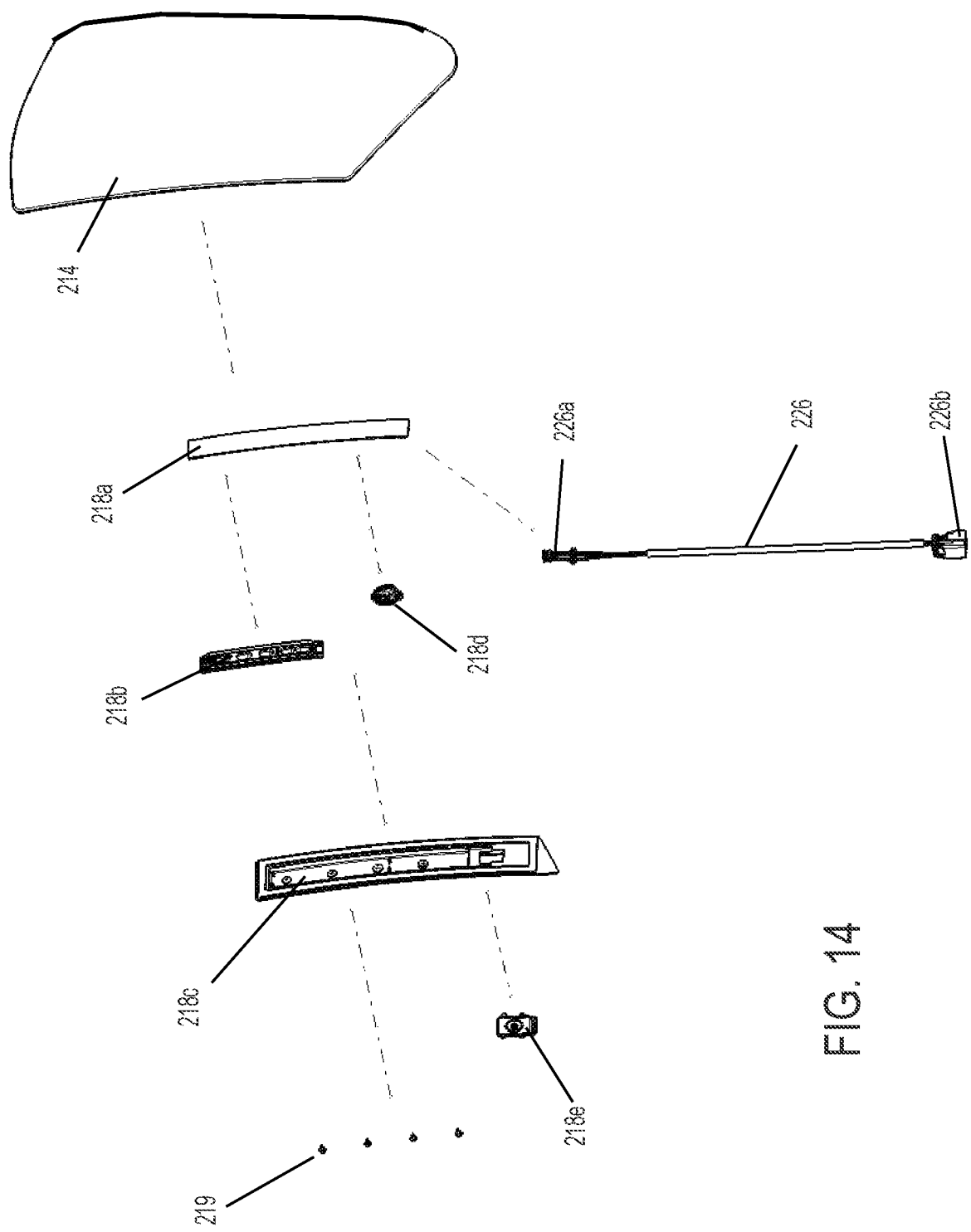
FIG. 14 is an exploded perspective view of the window assembly and touch sensor of FIG. 13.
Figure 15:
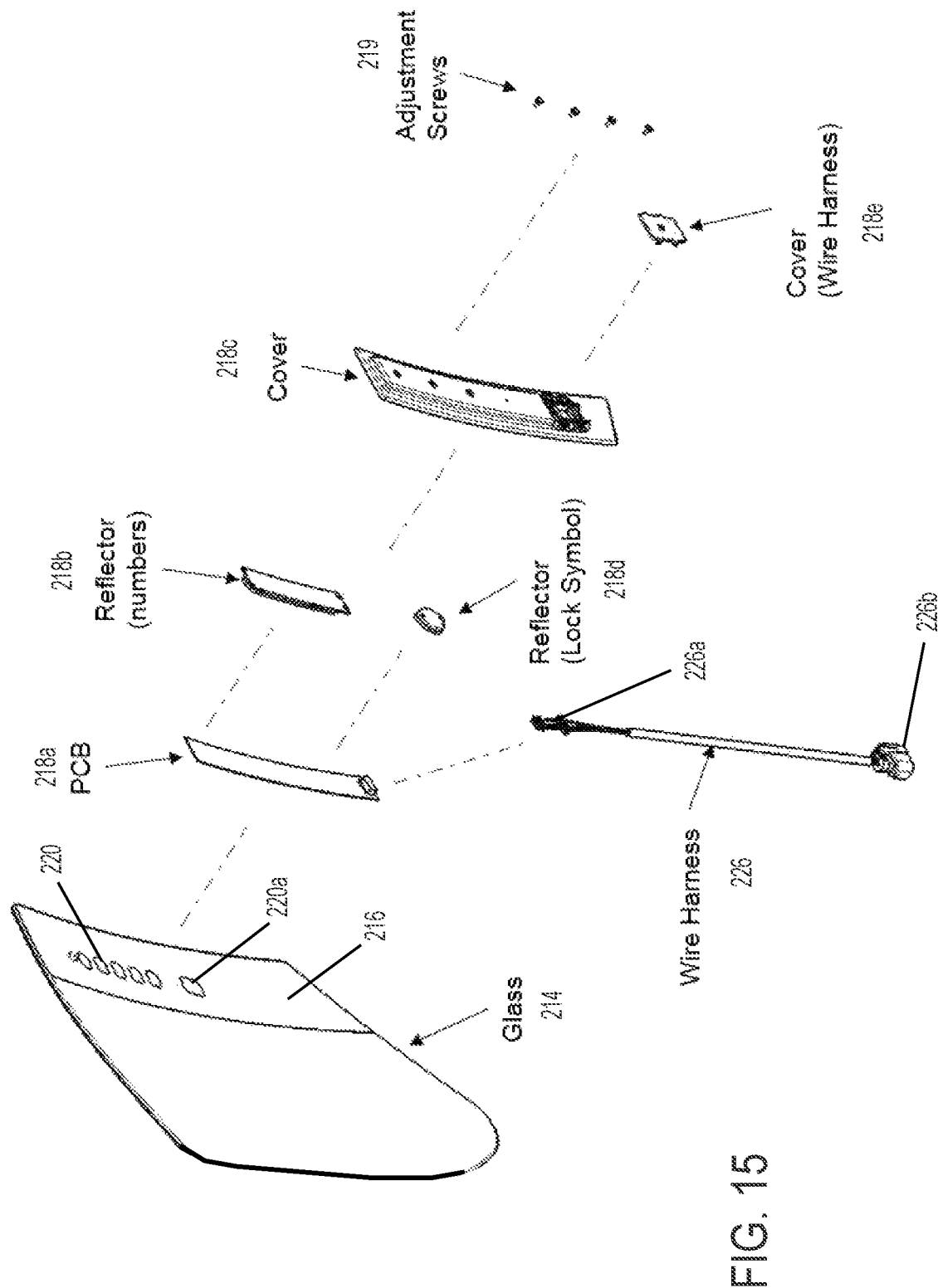
FIG. 15 is another exploded perspective view of the window assembly and touch sensor of FIG. 13.
Figure 16:
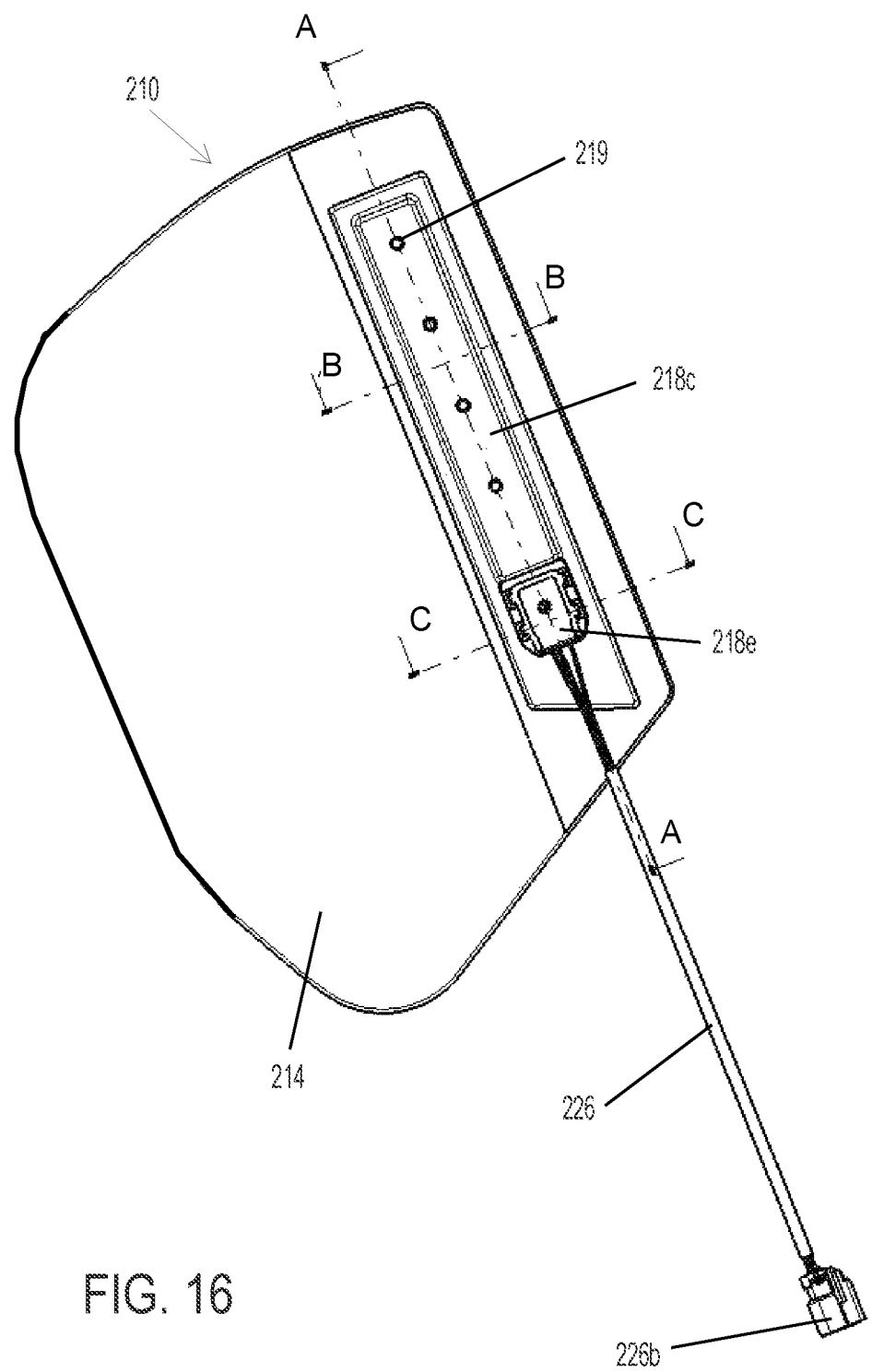
FIG. 16 is a side elevation of the window assembly and touch sensor of FIG. 13.
Figure 16A:
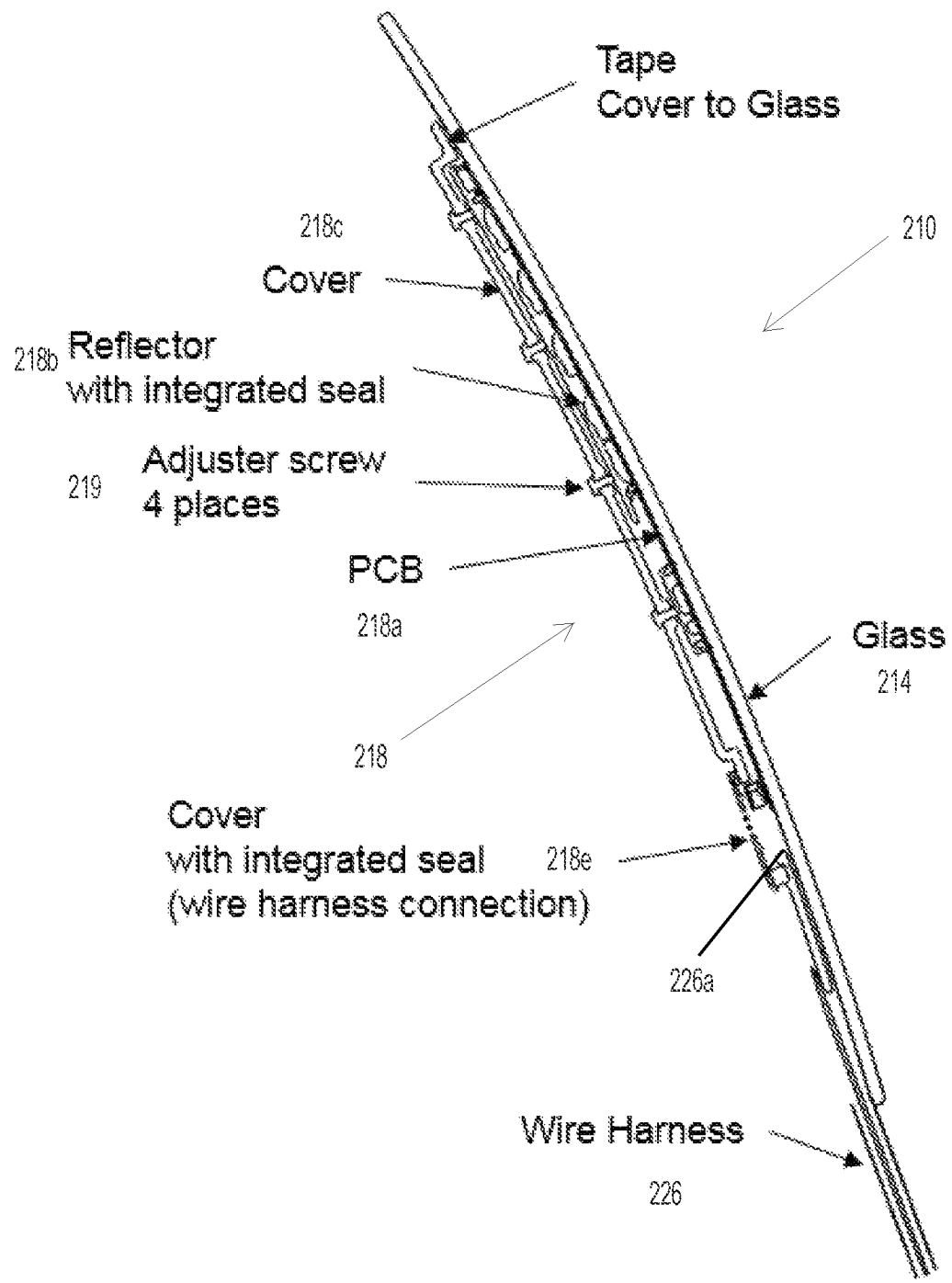
FIG. 16A is a sectional view taken along the line A-A in FIG. 16.
Figure 16B:
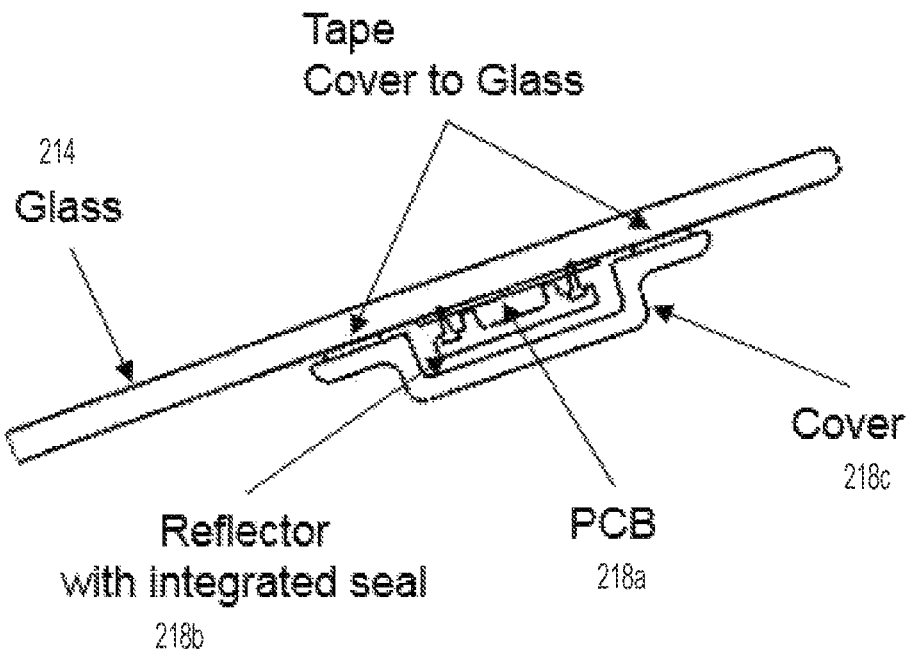
FIG. 16B is a sectional view taken along the line B-B in FIG. 16.
Figure 16C:
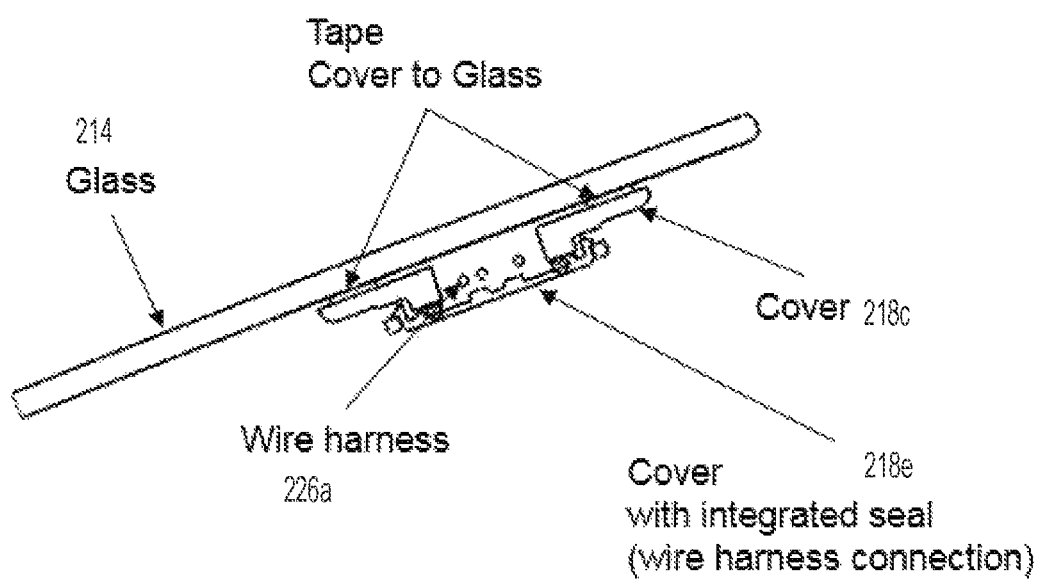
FIG. 16C is a sectional view taken along the line C-C in FIG. 16.

As can be seen with reference to FIGS. 12, 12A and 12B, the circuit element 118*a* is disposed at and along the interior surface of the glass panel 114, with the reflector 118*b* disposed over the circuit element. The cover 118*c* has a perimeter flange that provides an attaching surface that is attached or adhered or bonded or taped to the interior surface of the window panel. The lower end of the cover has an opening through which the connector 126 passes. In the illustrated embodiment of FIGS. 9-12, the connector comprises a coiled wire or cord that allows for flexibility and length adjustment when connecting the connector 126 to the vehicle wire harness.

The touch sensor device 118 may comprise a module, with the reflector and circuit board attached and nested into and retained at the cover (such as via a friction fit or adhesive or fasteners). Optionally, the circuit element may be taped to the frit-covered interior surface of the window panel, and the reflector may be attached or taped to the circuit element, and the cover may be attached or taped to the window panel and optionally to the reflector as well. If the sensor device is assembled at the window, the cover may be formed with its interior cavity engaging corresponding portions of the rear of the reflector to assist in positioning or aligning the cover at the reflector and window panel. Likewise, the reflector may have engaging or mating portions that engage or mate with corresponding portions of the circuit element to assist in positioning or aligning the reflector at the circuit element and window panel. The device 118 may provide similar illumination and sensing functions as discussed above with respect to device 18, such that a detailed discussion of those functions and devices need not be repeated herein.

Optionally, and such as shown in FIGS. 13-16, a window assembly 210 includes a touch sensor device 218 that is disposed behind the window panel 214 at the frit layer 216, with numbers and/or icons 220 (FIG. 15) established through the frit layer. The touch sensor device 218 includes backlighting such that the numbers and/or icons 220 are illuminated when the light source of the touch sensor device 218 is activated (such as responsive to a touch at the sensor region or detection of a passive entry device carried by a person approaching the vehicle or the like). The touch sensor device 218 includes an electrical lead or wire or connector 226 for electrically connecting the device 218 to a vehicle wire harness.

In the illustrated embodiment, the touch sensor device 218 includes a circuit element 218*a*, a reflector 218*b* and a cover 218*c* that encases the reflector and circuit element at the interior surface of the glass window panel 214. The circuit element 218*a* may comprise a printed circuit board or flexible circuit board or substrate having circuitry and light emitting diodes disposed thereat. The light emitting diodes (LEDs) may be spaced along the circuit board so as to be generally at or behind respective numbers or icons at the circuit board or the reflector, with the numbers or icons disposed behind (when the PCB and reflector are disposed at the window panel) respective apertures 220 etched through the frit layer of the window panel. The reflector 218*b* is formed to have individual light reflecting elements or portions or cavities at each of the LEDs so that, when the LEDs are powered, light emitted by the LEDs is reflected toward the window panel so as to be viewable at the etched windows 220 at the frit layer of the window panel. A separate reflector 218*d* may include a lock symbol that is disposed at the circuit board so as to reflect light (when the respective LED is energized) through a lock symbol window 220*a* at the frit layer of the window panel. The circuit element may comprise a transparent substrate or may have apertures formed therethrough to allow light emitted by the LEDs and reflected by the reflector to pass through the window for viewing at the etched numbers. The cover 218*c* encases or houses the reflectors and circuit element at the window panel.

As can be seen with reference to FIGS. 16, 16A, 16B and 16C, the circuit element 218*a* is disposed at and along the interior surface of the glass panel 214, with the reflector 218*b* disposed over the circuit element. The cover 218*c* has a perimeter flange that provides an attaching surface that is attached or adhered or bonded or taped to the interior surface of the window panel. The lower end of the cover has connector portion with an integrated seal at the wire harness connector (where the end 226*a* of the connector 226 attaches at the circuit element 218*a*). In the illustrated embodiment of FIGS. 13-16, the connector comprises a flexible wire with a plug or socket connector 226*b* at its end for connecting to the vehicle wire harness.

The touch sensor device 218 may comprise a module, with the reflector and circuit board attached and nested into and retained at the cover (such as via a friction fit or adhesive or fasteners). Optionally, the circuit element may be taped to the frit-covered interior surface of the window panel, and the reflector may be attached or taped to the circuit element, and the cover may be attached or taped to the window panel and optionally to the reflector as well. If the sensor device is assembled at the window, the cover may be formed with its interior cavity engaging corresponding portions of the rear of the reflector to assist in positioning or aligning the cover at the reflector and window panel. Likewise, the reflector may have engaging or mating portions that engage or mate with corresponding portions of the circuit element to assist in positioning or aligning the reflector at the circuit element and window panel.

In the illustrated embodiment, the circuit element 218*a* is set against the window panel 214 and the reflector 218*b* and reflector lock symbol 218*d* are disposed behind the circuit element. The cover element 218*c* is disposed over the reflectors and compresses or sandwiches the reflectors and circuit element between the cover and the window panel. The connector 226 has a PCB end 226*a* that is plugged into a connector at the circuit element and extends downward from the sensor device (and an additional cover element 218*e* may be provided to cover the connection of the connector 226 at the PCB 218*a*). The reflector 218*b* (and maybe also the reflector 218*d*) may comprise a compressible material so that it compresses when sandwiched between the cover and the window panel. For example, the reflector(s) may comprise a two-shot molded element that has a softer compliant or compressible material molded over a harder plastic reflector, such that the softer material compresses when the cover sandwiches the reflector and circuit element at the window panel. Optionally, adjustment screws 219 may be provided that allow for adjustment of the cover at the reflector to adjust the degree of compression at the reflector when the cover is disposed over the reflector and circuit element and taped or bonded at the window panel. The device 218 may provide similar illumination and sensing functions as discussed above with respect to devices 18, 118, such that a detailed discussion of those functions and devices need not be repeated herein.

Optionally, the sensor device may be disposed at or in a movable window panel, such as a side window panel that can be raised or lowered at the side of the vehicle (such as at a side door of the vehicle). For example, and such as shown in FIGS. 17 and 18, the sensor device 318 may be disposed at a movable (raisable/lowerable) window panel 314. In such a configuration, the display and touch sensing portion may be laminated tween two glass sheets of the window panel 314. Thus, the sensor device may comprise a thin strip with small LEDs or the like and icons (established either at the device or at a frit layer of the window panel). Because the sensor device is disposed in front of the inner sheet of the window panel (and the frit layer may be established at the inner surface of the inner sheet and thus behind the sensor device), the sensor device may comprise a black colored substrate so as to be not readily visible in front of the frit layer. Optionally, the sensor device may comprise a thin substrate that is taped to the interior surface of the window panel and is thin enough to be able to move with the window panel at the interior surface, whereby the sensor device may comprise a dark or black color so as to not be readily viewable at the frit layer when viewed from inside the vehicle.

The sensor device 318 includes a connector portion 326 that may extend along a lower edge of the window panel 314 for electrically connecting to a wire harness of the vehicle (when the window assembly is installed at the vehicle or vehicle door). Optionally, the sensor device may include its own power source (such as a battery disposed at the lower portion of the device that is outside of the laminated window panel, and may communicate wirelessly with the vehicle door lock system (and/or other systems of the vehicle) via a short range communication protocol, such as BLUETOOTH or the like. The device 318 may otherwise provide similar illumination and sensing functions as discussed above with respect to devices 18, 118, 218, such that a detailed discussion of those functions and devices need not be repeated herein.

Therefore, the present invention provides a touch sensor device at and behind a side window of a vehicle (and/or optionally at and behind a rear window of the vehicle), with the sensor device disposed behind a darkened region or frit layer region of the window panel. The frit layer region has numbers/icons established therethrough (such as via masking of the window panel during the coating or establishing of the frit layer at the surface of the window panel. The locations of the individual touch sensors of the sensor device are disposed at respective numbers or icons and operate to sense the presence or proximity or touch of a person's finger at the respective numbers or icons. The sensor device backlights the numbers/icons so that a user can readily see the backlit/illuminated numbers/icons at the window panel. The backlighting may be activated responsive to approach of an authorized user (e.g., a person carrying a key fob for the vehicle) or responsive to a touch or proximity sensed at the sensor device and sensing region of the window panel (e.g., responsive to a person touching at or near the sensing region).

The window assembly comprises a fixed or non-openable window (such as a rear quarter window as shown in the illustrated embodiment). Optionally, the sensing system of the present invention may be suitable for use in a movable or openable/closable window assembly, such as a rear liftgate window assembly. Optionally, the sensing system of the present invention may be suitable for use in a movable or slidable (such as horizontally slidable or vertically slidable) window assembly, where the sensing device may be disposed at an interior portion of the movable window panel that is encompassed by an interior trim of the vehicle, or where the sensing device is thin enough and may be overcoated or overmolded (such as by a window perimeter encapsulant) so that the sensing device is not readily noticeable at the interior surface of the window panel when the window panel is closed.

The touch sensitive elements or touch sensors or proximity sensors of the sensing device and window assembly may comprise any suitable sensors, such as the types of touch sensitive elements and/or proximity sensors described in U.S. Pat. Nos. 5,594,222; 6,001,486; 6,310,611; 6,320,282; 6,627,918; 7,224,324; 7,249,860; 7,253,723; 7,446,924; 9,346,403 and/or 9,598,016, and/or U.S. Publication No. US-2006-0050018, which are hereby incorporated herein by reference in their entireties, or such as sensors of the types described in U.S. Pat. Nos. 7,255,541; 6,504,531; 6,501,465; 6,492,980; 6,452,479; 6,437,258 and/or 6,369,804, which are hereby incorporated herein by reference in their entireties.

Optionally, the window assembly or assemblies of the present invention may utilize aspects of the window assemblies described in U.S. Pat. Nos. 8,881,458; 8,402,695; 5,853,895; 5,551,197; 7,073,293; 7,003,916 and/or 6,691,464, and/or U.S. Publication Nos. US-2017-0066305; US-2014-0170357; US-2006-0107600; US-2008-0127563; US-2004-0020131 and/or US-2003-0213179, which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A window assembly for a vehicle, said window assembly comprising:

a glass window panel;

wherein said glass window panel has a non-light-transmitting layer established at a perimeter region thereof;

a sensing device disposed at an interior surface of said glass window panel at and behind said non-light-transmitting layer;

wherein said non-light-transmitting layer has a plurality of light-transmitting apertures established thereat;

wherein said sensing device is disposed at said interior surface of said glass window panel such that a sensor of said sensing device is disposed at a respective one of said light-transmitting apertures established at said non-light-transmitting layer;

wherein said sensing device includes a plurality of illumination sources, and wherein, when each of said illumination sources is activated, the respective activated illumination source emits light through a respective light-transmitting aperture established at said non-light-transmitting layer and does not emit light through said non-light-transmitting layer;

wherein said sensing device comprises a circuit element and a reflector, and wherein said illumination sources are disposed at said circuit element, and wherein said reflector is disposed along said circuit element to reflect light emitted by said illumination sources toward and through said glass window panel;

wherein, when said glass window panel is disposed at a vehicle and said illumination sources are activated, a person viewing said glass window panel from exterior of the vehicle views a plurality of light-transmitting icons or alphanumeric characters illuminated by respective ones of said illumination sources; and wherein said light-transmitting apertures comprise the light-transmitting icon or alphanumeric characters established at said non-light-transmitting layer, and wherein said illumination sources, when activated, emit light through respective ones of the light-transmitting icons or alphanumeric characters established at said non-light-transmitting layer.

2. The window assembly of claim 1, wherein said sensing device comprises a cover element, and wherein said circuit element and said reflector are disposed within a cavity of said cover element and between said cover element and said glass window panel.

3. The window assembly of claim 2, wherein said cover element is adhesively attached at said glass window panel.

4. The window assembly of claim 3, wherein said reflector comprises a compressible material and compresses when said cover element is attached at said glass window panel.

5. The window assembly of claim 1, wherein said sensing device comprises a plurality of individual sensors, with each of said sensors disposed at and behind a respective one of the light-transmitting icons or alphanumeric characters established at said non-light-transmitting layer.

6. The window assembly of claim 1, wherein said window assembly is configured to mount at a vehicle rearward of a door of the vehicle, and wherein said sensing device is disposed at a forward region of said glass window panel.

7. The window assembly of claim 6, wherein said window assembly comprises a fixed or non-openable window assembly.

8. The window assembly of claim 1, wherein said sensing device comprises a feedback indicator that is operable to illuminate responsive to a successful touch sensing by said sensor at one or more of the light-transmitting icons or alphanumeric characters, and wherein said feedback indicator is disposed behind and illuminating through a light-transmitting aperture established at said non-light-transmitting layer.

9. The window assembly of claim 1, comprising a gesture sensing device disposed at the interior surface of said glass window panel and sensing through a light-transmitting aperture established at said non-light-transmitting layer.

10. A window assembly for a vehicle, said window assembly comprising:
a glass window panel;
wherein said glass window panel has a non-light-transmitting layer established at a perimeter region thereof;
a sensing device disposed at an interior surface of said glass window panel at and behind said non-light-transmitting layer;
wherein said non-light-transmitting layer has a plurality of light-transmitting apertures established thereat;
wherein said sensing device is disposed at said interior surface of said glass window panel such that a sensor of said sensing device is disposed at a respective one of said light-transmitting apertures established at said non-light-transmitting layer;
wherein said sensing device includes a plurality of light emitting diodes, and wherein, when each of said light emitting diodes is activated, the respective activated light emitting diode emits light through a respective light-transmitting aperture established at said non-light-transmitting layer and does not emit light through said non-light-transmitting layer;
wherein said sensing device comprises a circuit element, a reflector and a cover element, and wherein said light emitting diodes are disposed at said circuit element, and wherein said reflector is disposed along said circuit element to reflect light emitted by said light emitting diodes toward and through said glass window panel;
wherein said circuit element and said reflector are disposed within a cavity of said cover element and between said cover element and said glass window panel;
wherein said sensing device comprises an electrical connector configured to electrically connect circuitry of said circuit element to a wire harness of a vehicle when said glass window panel is disposed at the vehicle; and
wherein, when said glass window panel is disposed at the vehicle and said light emitting diodes are activated, a person viewing said glass window panel from exterior of the vehicle views a plurality of light-transmitting icons or alphanumeric characters illuminated by respective ones of said light emitting diodes.

11. The window assembly of claim 10, wherein said light-transmitting apertures comprise the light-transmitting icons or alphanumeric characters established at said non-light-transmitting layer, and wherein said light emitting diodes, when activated, emit light through respective ones of the light-transmitting icons or alphanumeric characters established at said non-light-transmitting layer.

12. The window assembly of claim 11, wherein said cover element is adhesively attached at said glass window panel.

13. The window assembly of claim 12, wherein said reflector comprises a compressible material and compresses when said cover element is attached at said glass window panel.

14. The window assembly of claim 10, wherein said window assembly is configured to mount at a vehicle rearward of a door of the vehicle, and wherein said sensing device is disposed at a forward region of said glass window panel.

15. The window assembly of claim 14, wherein said window assembly comprises a fixed or non-openable window assembly.

16. The window assembly of claim 10, wherein said sensing device comprises a feedback indicator that is operable to illuminate responsive to a successful touch sensing by said sensor at one or more of the light-transmitting icons or alphanumeric characters, and wherein said feedback indicator is disposed behind and illuminating through a light-transmitting aperture established at said non-light-transmitting layer.

17. The window assembly of claim 10, comprising a gesture sensing device disposed at the interior surface of said glass window panel and sensing through a light-transmitting aperture established at said non-light-transmitting layer.

18. A window assembly for a vehicle, said window assembly comprising:
a glass window panel comprising an inner glass sheet and an outer glass sheet that are laminated together;
wherein said glass window panel comprises a movable glass window panel that is movably disposed at the vehicle and is movable between an opened position and a closed position;
a sensing device disposed between said laminated inner and outer glass sheets of said glass window panel;
wherein said sensing device includes a plurality of sensors and a plurality of illumination sources disposed between said laminated inner and outer glass sheets of said glass window panel;
wherein, when said movable glass window panel is in the closed position, and when individual ones of said illumination sources are activated, the respective illumination sources emit light that is viewable through said outer glass sheet;

wherein, when said glass window panel is disposed at a vehicle and one or more of said illumination sources are activated, a person viewing said glass window panel from exterior of the vehicle views one or more of a plurality of icons or alphanumeric characters illuminated by the respective one or more of said illumination sources; and wherein, when said illumination sources are not activated, said sensing device is not readily visible to the person viewing said glass window panel from exterior of the vehicle.

19. The window assembly of claim 18, wherein said glass window panel has a non-light-transmitting layer established at a perimeter region thereof, and wherein said sensing device is disposed at said non-light-transmitting layer.

20. The window assembly of claim 19, wherein said non-light-transmitting layer is established at said inner glass sheet.

21. The window assembly of claim 19, wherein said non-light-transmitting layer is established at said outer glass sheet.

22. The window assembly of claim 18, wherein said plurality of sensors and said plurality of illumination sources are disposed on a thin strip that is disposed between said laminated inner and outer glass sheets.

* * * * *